United States Patent
Bowman et al.

(10) Patent No.: US 9,209,980 B2
(45) Date of Patent: Dec. 8, 2015

(54) PROVISIONING A SHARED SECRET TO A PORTABLE ELECTRONIC DEVICE AND TO A SERVICE ENTITY

(75) Inventors: Roger Paul Bowman, Kitchener (CA); Robert Henderson Wood, Waterloo (CA); Nicolaas Santoso Handojo, Kitchener (CA); John Michael Agar, Kitchener (CA); Brian Paul Neill, Burlington (CA)

(73) Assignee: BlackBerry Limited, Waterloo (CA)

( * ) Notice: Subject to any disclaimer, the term of this patent is extended or adjusted under 35 U.S.C. 154(b) by 174 days.

(21) Appl. No.: 13/528,900

(22) Filed: Jun. 21, 2012

(65) Prior Publication Data

US 2012/0331287 A1   Dec. 27, 2012

Related U.S. Application Data

(60) Provisional application No. 61/499,589, filed on Jun. 21, 2011.

(51) Int. Cl.
*H04L 29/06* (2006.01)
*H04L 9/32* (2006.01)
(Continued)

(52) U.S. Cl.
CPC .......... *H04L 9/3273* (2013.01); *H04L 9/0844* (2013.01); *H04L 9/3066* (2013.01); *H04L 12/04* (2013.01); *H04L 12/06* (2013.01); *H04L 2209/60* (2013.01); *H04L 2209/80* (2013.01)

(58) Field of Classification Search
CPC ... H04L 63/08; H04L 63/0823; H04L 9/3273; H04L 9/0844; H04L 9/3066; H04L 2209/60; H04L 2209/80; H04W 12/04; H04W 12/06
See application file for complete search history.

(56) References Cited

U.S. PATENT DOCUMENTS 6,834,269 B1 * 12/2004 Bueche .......................... 705/56
7,461,260 B2 * 12/2008 Drews et al. .................. 713/180
(Continued)

FOREIGN PATENT DOCUMENTS

| WO | 9818234 | 4/1998 |
|----|---------|--------|
| WO | WO2010/057312 | * 11/2009 |
| WO | 2010057312 | 5/2010 |

OTHER PUBLICATIONS

Mariggis, Athanasios, Extended European Search Report for EP 12172883.6, Sep. 27, 2012.
(Continued)

*Primary Examiner* — Mahfuzur Rahman
*Assistant Examiner* — Carlos Amorin
(74) *Attorney, Agent, or Firm* — Integral Intellectual Property Inc.; Miriam Paton; Amy Scouten

(57) ABSTRACT

Systems and methods are provided for computing a secret shared with a portable electronic device and service entity. The service entity has a public key G and a private key g. A message comprising the public key G is broadcast to the portable electronic device. A public key B of the portable electronic device is obtained from a manufacturing server and used together with the private key g to compute the shared secret. The portable electronic device receives the broadcast message and computes the shared secret as a function of the public key G and the portable electronic device's private key b. The shared secret can be used to establish a trusted relationship between the portable electronic device and the service entity, to activate a service on the portable electronic device, and to generate certificates.

38 Claims, 13 Drawing Sheets

(51) Int. Cl.
*H04L 9/08* (2006.01)
*H04L 9/30* (2006.01)
*H04L 12/04* (2006.01)
*H04L 12/06* (2006.01)

(56) References Cited

U.S. PATENT DOCUMENTS

| | | | |
|---|---|---|---|
| 7,783,884 B2* | 8/2010 | Nakano et al. | 713/175 |
| 8,341,715 B2* | 12/2012 | Sherkin et al. | 726/10 |
| 8,631,247 B2* | 1/2014 | O'Loughlin et al. | 713/189 |
| 2002/0018569 A1* | 2/2002 | Panjwani et al. | 380/247 |
| 2004/0255135 A1* | 12/2004 | Kitaya et al. | 713/193 |
| 2007/0149174 A1* | 6/2007 | Torvinen | 455/412.1 |
| 2008/0301459 A1* | 12/2008 | Ebeid | 713/180 |
| 2009/0119506 A1* | 5/2009 | Allen et al. | 713/156 |
| 2010/0042838 A1* | 2/2010 | Ho | 713/169 |
| 2010/0250796 A1* | 9/2010 | Jevans et al. | 710/36 |
| 2011/0219232 A1* | 9/2011 | Yamaguchi et al. | 713/169 |
| 2012/0102334 A1* | 4/2012 | O'Loughlin et al. | 713/189 |
| 2012/0105249 A1* | 5/2012 | Bauerfeld et al. | 340/870.02 |
| 2012/0191971 A1* | 7/2012 | Battistello et al. | 713/155 |
| 2012/0210421 A1* | 8/2012 | Ormazabal et al. | 726/22 |
| 2012/0265983 A1* | 10/2012 | Yegin et al. | 713/155 |
| 2012/0290830 A1* | 11/2012 | Resch et al. | 713/150 |
| 2012/0317261 A1* | 12/2012 | Ahmavaara | 709/223 |
| 2013/0204415 A1* | 8/2013 | Fregley et al. | 700/94 |

OTHER PUBLICATIONS

Mariggis, First Exam Report for EP 12172883.6, Dec. 10, 2014.
Sabharwal, Second Office Action for CA2780879, Sep. 4, 2015.

* cited by examiner

PROVISIONING A SHARED SECRET TO A PORTABLE ELECTRONIC DEVICE AND TO A SERVICE ENTITY

CROSS-REFERENCE TO RELATED APPLICATIONS

This application claims domestic priority under 35 U.S.C. §119(e) from U.S. Provisional Patent Application No. 61/499,589, filed Jun. 21, 2011, and which is incorporated by reference herein in its entirety.

TECHNICAL FIELD

The following relates to provisioning a portable electronic device with credentials. More specifically, the following relates to how to provision the portable electronic device with credentials from which the portable electronic device can determine a shared secret or shared-secret dependent data. The shared secret or shared-secret dependent data are shared between the portable electronic device and a service entity that provides a service. The portable electronic device uses the shared secret or shared-secret dependent data for activating the service.

BACKGROUND

A portable electronic device may seek to establish a trusted relationship with a service entity that provides a service, such as a mobile video streaming service or an electronic book subscription service. The trusted relationship may be achieved through successful mutual authentication in which the portable electronic device is able to verify the identity of the service entity, and the service entity is able to verify the identity of the portable electronic device. Typically, authentication is achieved using cryptographic data and credentials, such as keys. For example, the portable electronic device and the service entity may each possess cryptographic data which can be exchanged in order to authenticate each other.

Portable electronic devices may be provisioned with cryptographic data and credentials during the manufacturing process.

DETAILED DESCRIPTION

Figure 1:
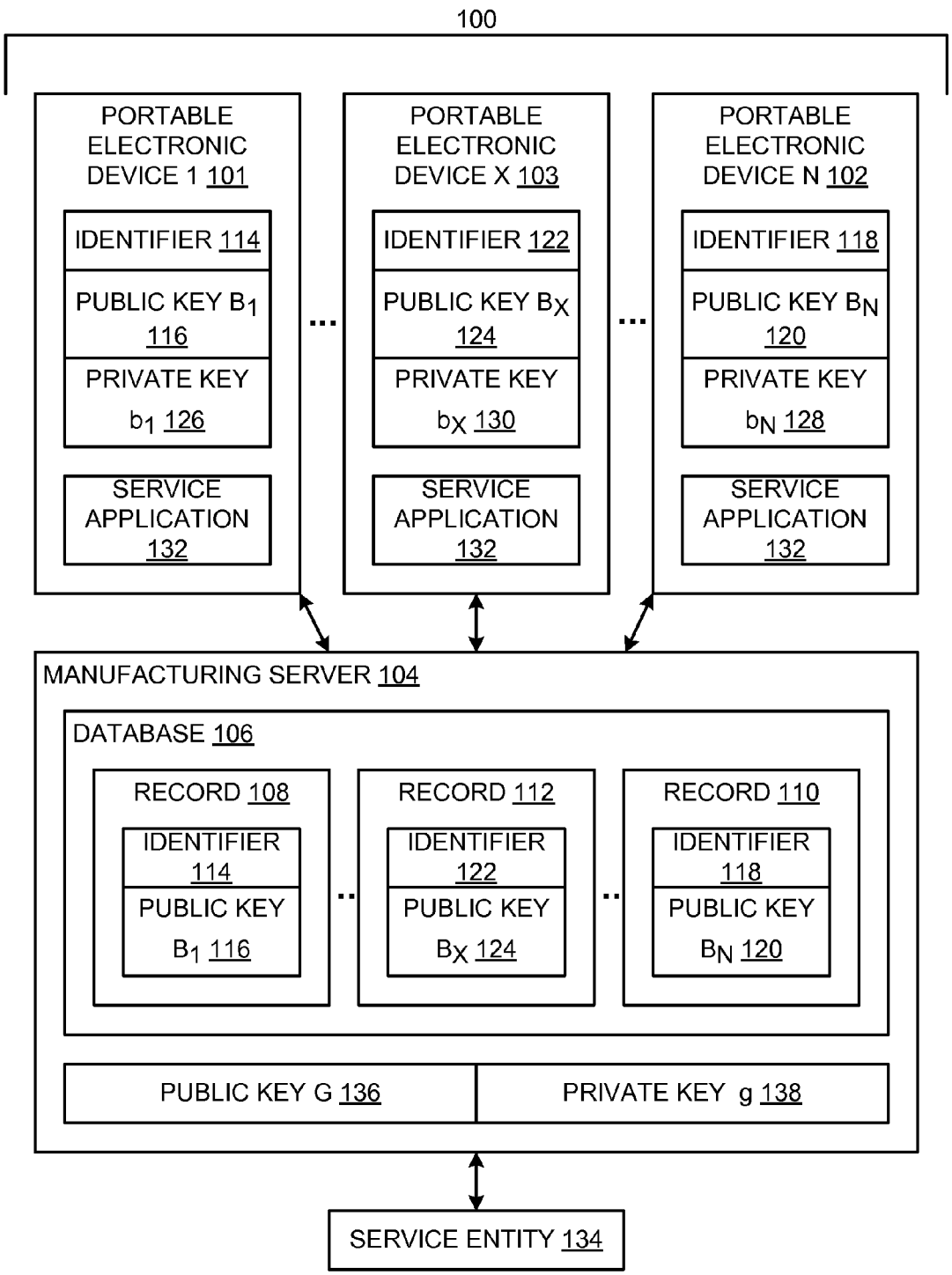
FIG. 1 is a schematic diagram illustrating a system in which an example service entity and an example manufacturing server are in communication with one or more example portable electronic devices.

During the manufacturing process, each portable electronic device is assigned at least one identifier that uniquely distinguishes that portable electronic device from all the other portable electronic devices produced by that manufacturer. Also during the manufacturing process, portable electronic devices are assigned cryptographic data by the manufacturer or by a vendor to the manufacturer, such that the cryptographic data uniquely distinguishes a particular portable electronic device from all the other portable electronic devices produced by that manufacturer. For example, each portable electronic device may be assigned a cryptographic key pair consisting of a public key B and a corresponding private key b, where the key pair is unique to the particular portable electronic device to which it was assigned. For each portable device, the manufacturer may maintain a record of the public key B that was assigned that portable electronic device and the unique identifier of that portable device. The private key b of the portable electronic device may be used, for example, for authentication services or for anti-counterfeit services. Both the public key B and the private key b may be provided to a trusted module of the portable electronic device, for example, as part of a processor key assignment (PKA) process. Such a process may involve, for example, securing the trusted module, binding the cryptographic key pair (B, b) to the trusted module, and returning a combination of an identifier of the trusted module and the public key B to the manufacturer. Examples of PKA processes are described in further detail in United States Patent Application Publication Nos. US 2011/0010770, US 2011/0063093, and US 2011/0010720, which are incorporated herein by reference. In one example, the cryptographic key pair (B, b) of the portable electronic device is provisioned to the portable electronic device by a vendor of the trusted module.

Portability, as referred to herein, typically entails not only a capability of being moved and used from place to place, but also a portable power supply, such as a battery or micro fuel cell, that can supply power to the device for a limited time. Any of the portable electronic devices described herein may be handheld, that is, sized to be held or carried in a human hand. However, the portable electronic devices described herein may also refer more generally to computing devices, which may or may not be portable. In one example, the portable electronic devices described herein may include set top boxes.

The portable electronic devices described herein can be multi-way communication devices with advanced data communication capabilities including the capability to communicate with other portable electronic devices or computer systems through a network of transceiver stations. The portable electronic devices described herein may also have the capability to allow voice communication. Depending on the functionality provided by the portable electronic device, it may be referred to as a data messaging device, a multi-way pager, a cellular telephone with data messaging capabilities, a wireless Internet appliance, or a data communication device (with or without telephony capabilities). Other non-limiting examples of portable electronic devices include laptops, tablets, smart phones, wireless phones, and personal digital assistants (PDAs).

As described previously, for each portable electronic device, the manufacturer maintains a record of the public key B that was assigned to the portable electronic device and one or more identifiers of the portable electronic device, where at least one of the identifiers is unique to that portable electronic device. In one example, the records are stored in a manufacturing database accessible by a manufacturing server.

In the example illustrated in FIG. 1, during the manufacture of portable electronic devices 100, including a portable electronic device 1 101, a portable electronic device N 102, and a portable electronic device X 103, a manufacturing server 104 stores in its manufacturing database 106 a record 108, a record 110, and a record 112 corresponding to the portable electronic device 1 101, to the portable electronic device N 102, and to the portable electronic device X 103, respectively. The record 108 includes one or more identifiers 114 of the portable electronic device 1 101, along with a public key $B_1$ 116 of the portable electronic device 1 101. Similarly, the record 110 includes one or more identifiers 118 of the portable electronic device N 102, along with a public key $B_N$ 120 of the portable electronic device N 102. Similarly, the record 112 includes one or more identifiers 122 of the portable electronic device X 103, along with a public key $B_X$ 124 of the portable electronic device X 103.

The portable electronic device 1 101 stores its one or more identifiers 114 and its public key $B_1$ 116, as well as a private key $b_1$ 126 that forms a public/private key pair with the public key $B_1$ 116. Similarly, the portable electronic device N 102 stores its one or more identifiers 118 and its public key $B_N$ 120, as well as a private key $b_N$ 128 that forms a public/private key pair with the public key $B_N$ 120. The subscript N is used to denote that multiple portable electronic devices may be manufactured, and that records for all the portable electronic devices 100 are maintained by the manufacturing server 104 in the manufacturing database 106. For example, if there are millions of portable electronic devices 100, there may be millions of key pairs, and thus millions of public keys and corresponding portable electronic device identifiers are recorded in the manufacturing database 106. Each portable electronic device having a record in the manufacturing database 106 is considered to be tracked by the manufacturing server 104. In general, the portable electronic devices described herein may all be considered as "tracked" portable electronic devices in that their public keys and identifiers are maintained by a manufacturing server.

Similarly to the portable electronic devices 1 101 and N 102, the portable electronic device X 103 stores its one or more identifiers 122 and its public key $B_X$ 124, as well as a private key $b_X$ 130 that forms a public/private key pair with the public key $B_X$ 124.

One or more of the portable electronic devices 100 may also have installed thereon a service application 132 for any service Y that requires the ability to authenticate the portable electronic device and establish a secure connection to the portable electronic device. An example type of a service application is a subscription application, in which the portable electronic device itself or a user of the portable electronic device requires a subscription to access a service Y. Non-limiting examples of services to be accessed through service applications include mobile video streaming services and electronic book subscription services. An example of a non-subscription service application is a movie rentals application.

The portable electronic devices 100 may obtain the service application 132 from a service entity 134, which provides the service Y to the service application 132 on the portable electronic devices 100. Thus service application 132 is a client application, and service entity 134 has installed thereon a corresponding server application for providing the service Y to the client application. Alternatively, the portable electronic devices 100 may obtain the service application 132 via the manufacturing server 104 or even during the manufacturing process. The service entity 134 may seek to authenticate any of the portable electronic devices 100 prior to providing service Y thereto. Similarly, any of the portable electronic devices 100 may seek to authenticate the service entity 134 prior to receiving service Y therefrom. It may also be of interest to establish a secure relationship between any of the portable electronic devices 100 and the service entity 134. Mutual authentication and the establishment of a secure relationship may be facilitated through the use of cryptographic keys.

In many cases, one or more portable electronic devices 100 may seek to subscribe or connect to the service entity 134 long after the manufacturing process is completed for those portable electronic devices. However, if the portable electronic devices 100 have already been deployed and are therefore already in use by consumers and other end users, that is, if the portable electronic devices are "in the field" or "in market", and if the service Y typically uses a secure manufacturing provisioning step, then there may be some difficulty in forming a secure relationship between the portable electronic devices 100 and the service entity 134 providing the service Y.

For example, after purchasing the portable electronic device X 103, a user of the portable electronic device X 103 may wish to use the portable electronic device X 103 to access a mobile video streaming service or an electronic book subscription service. As such a decision is made after the manufacturing process has ended, any cryptographic keys needed by the portable electronic device X 103 to authenticate itself to the mobile video streaming service or to the electronic book subscription service would have to be obtained by the portable electronic device X 103 post-manufacture.

An example approach to address this issue is to provision portable electronic devices on an individual basis with the cryptographic keys. For example, in response to a request to the service entity 134 from the particular portable electronic device X 103 to access the service Y or to activate the service Y, the service entity 134 could establish a unique cryptographic key to be shared with the portable electronic device X 103. However, provisioning a portable electronic device in the field, or after manufacturing, with a unique cryptographic key established by the service entity 134 is much more difficult than provisioning during manufacturing due to the extra services that are required. For example, in order for the service entity 134 to provision the portable electronic device X 103 in the field with a unique cryptographic key, the service entity 134 may be required a) to prove to itself that the portable electronic device X 103 is genuine and not a simulator or some other device that is purporting to be the portable electronic device X 103 for the purpose of gaining service outside of the service Y's licensed terms of use, b) to calculate unique device credentials for the portable electronic device X 103, c) to securely provision the unique credentials to the portable electronic device X 103, and d) to maintain a registration database of unique device identifiers and actively look for potential abuses in case the proof established at a) results from a flawed and/or imperfect check. Furthermore, the complexity of such a post-manufacture provisioning process drastically increases with the number of portable electronic devices 100 that are trying to access the service entity. For example, if millions of portable electronic devices 100 are simultaneously trying to access the service entity 134 and to activate the service Y, then large physical infrastructure and large computing resources may be required. In this situation, it may be necessary to increase the number of servers maintained by the service entity 134, as well as the data bandwidth offered by the servers, and the capacity of communication wires to carry the data bandwidth. Customer support costs for the service entity 134 and the manufacturer of the portable electronic devices may also increase if an interactive, infield provisioning step is used to provision the portable electronic devices with the set of unique cryptographic keys established by the service entity 134. For example, customer support costs may be incurred through the operation of a call center employing customer support technicians to obtain customer identifications from users and use the customer identifications to facilitate a push-type provisioning operation to the portable electronic devices of those users. Thus, significant preparation and resources may be involved even before the launch of a service application to portable electronic devices.

However, as shown in FIG. 1 and as will be discussed in detail below, techniques involving communication between the service entity 134 and the manufacturing server 104 may be used to provision any of the portable electronic devices 100 with the cryptographic keys needed to establish a trusted relationship with the service entity 134. A trusted relationship is assumed to be established between the particular portable electronic device X 103 and the service entity 134 when mutual authentication has succeeded. By forming and leveraging a relationship between the service entity 134 and the manufacturing server 104, services, such as the service Y, may be provided to the particular portable electronic device X 103 by the service entity 134 in a secure manner. Security may be established by encrypting communications between the particular portable electronic device X 103 and the service entity 134.

The techniques disclosed herein facilitate the provisioning of credentials, such as a shared secret or data dependent on a shared secret, between the service entity 134 and any of the portable electronic devices 100. This may be done efficiently and quickly for multiple portable electronic devices 100 that are already out in the field (e.g. portable electronic devices for which the manufacturing process is complete). The credentials are computed using the cryptographic key pair unique to a particular one of the portable electronic devices 100, such as the particular portable electronic device X 103, and using a cryptographic key pair of the service entity 134. In particular, the service entity 134 has associated with it a cryptographic key pair consisting of a public key G 136 and corresponding private key g 138. In one example, the key pair (G, g) of the service entity 134 is generated by the service entity 134. In that example, the private key g 138 is in the sole possession of the service entity 134, unknown to all others including to the manufacturing server 104. In another example, the key pair (G, g) of the service entity 134 is generated by the manufacturing server 104 on behalf of the service entity 134, and the manufacturing server 104 possesses the public key G 136 and the private key g 138, as shown in FIG. 1. In that example, the manufacturing server 104 may optionally share the public key G 136 and the private key g 138 with the service entity 134.

A number of figures are discussed below with respect to post-manufacture provisioning of credentials, such as a shared secret or data dependent on a shared secret, to one or more portable electronic devices that are already in the field, where the credentials may be used to activate a service on the portable electronic devices.

Figure 2:
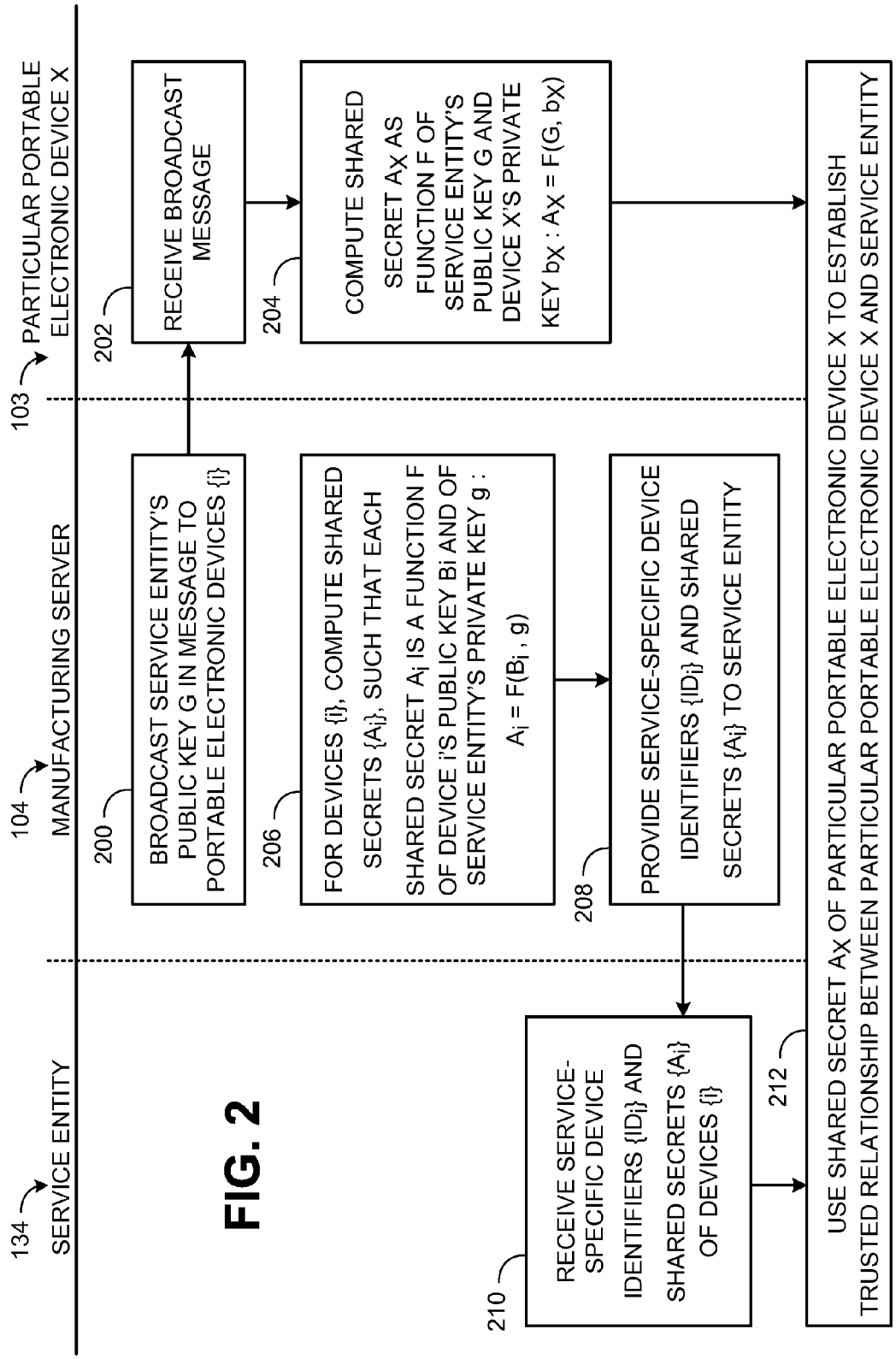
FIG. 2 is a flow diagram illustrating a first example procedure for provisioning a shared secret to a portable electronic device and to a service entity for establishing a trusted relationship therebetween.

FIG. 2 illustrates a first example procedure for provisioning a shared secret to a portable electronic device and to a service entity for establishing a trusted relationship therebetween. The procedure can apply to multiple portable electronic devices 100, although for ease of understanding, it is described with respect to the particular portable electronic device X 103.

At 200, the manufacturing server 104 broadcasts a message to one or more of the portable electronic devices 100, where the message comprises the public key G 136 of the service entity 134. The public key G 136 may have been generated by the manufacturing server 104 on behalf of the service entity 134, together with the corresponding private key g 138. In one example, the private key g 138 is a random number and the public key G 136 is computed from the private key g 138 using elliptic curve cryptography (ECC) techniques. For example, the private key g 138 is a randomly or pseudo-randomly or quasi-randomly selected integer, and the public key G 136 is obtained from a point multiplication of the private key g 138 and a base point or generator L on an elliptic curve, that is G=gL.

The manufacturing server 104 may maintain a different cryptographic key pair (G, g) for each service entity on behalf of which it is provisioning credentials. In the examples where the cryptographic key pair (G, g) is generated on behalf of the service entity 134 and where the credentials are computed by the manufacturing server 104, as will be discussed, there may be no need for the service entity 134 to even be privy to the public key G 136 or to the private key g 138.

The broadcast message may be a message that reaches multiple or all of the portable electronic devices 100 that are being tracked by the manufacturing server 104. The set of the portable electronic devices 100 which the message is intended to reach is denoted {i}, where i denotes an index associated with a particular one of the portable electronic devices 100. Examples of broadcast messages include software updates, operating system updates, and firmware updates. Example mechanisms of a broadcast message also include software update services and an application market place, which can reach multiple tracked portable electronic devices. In other words, when the manufacturing server 104 broadcasts a message, such a message may include the public key G 136 of the service entity 134. Thus, the public key G 136 can be "piggy-backed" on the broadcast message and can thus be pushed to, or provided to, the portable electronic devices {i}. Therefore, the individual portable electronic devices {i} do not need to contact the service entity 134 to obtain the public key G 136. Using a single event, such as a broadcast message, to transmit the public key G 136 is very efficient for the service entity 134 as compared to, for example, having the service entity 134 being contacted multiple times by multiple individual ones of the portable electronic devices {i} that seek to obtain the public key G 136.

Continuing with FIG. 2, at 202, the particular portable electronic device X 103 receives the broadcast message, including the public key G 136 of the service entity 134. At 204, the particular portable electronic device X 103 computes a shared secret $A_X$ as a function F of the service entity's public key G 136 and of a private key by of its own cryptographic key pair $(B_X, b_X)$, that is $A_X = F(G, b_X)$.

The computation of the shared secret $A_X$ may be performed using a discrete log-based cryptographic standard, for example, a Diffie-Hellman key exchange algorithm or any variation thereof. In one example, an elliptic curve Diffie-Hellman (ECDH) algorithm is used to establish the shared secret $A_X$. For example, the elliptic curve SECP521R1 could be used because it is a cryptographically strong curve from which keys of high security can be generated. In another example, an ElGamal key agreement algorithm, as described in "The Handbook of Applied Cryptography" by Menezes et al., is used to establish the shared secret $A_X$. However, other algorithms for computing a shared secret can be used.

The manufacturing server 104 stores for each of the portable electronic devices {i} an association between an identifier of the portable electronic device i and the portable electronic device's public key $B_i$. The manufacturing server 104 computes at 206 a shared secret $A_i$ for each of the portable electronic devices {i}, where the shared secret $A_i$ is a function F of the service entity's private key g 138 and of the public key $B_i$ of the portable electronic device i, that is $A_i = F(B_i, g)$. Any of the shared secrets $\{A_i\}$ may be computed by the manufacturing server 104 at any time before, during or after the manufacturing server broadcasts the service entity's public key G in a message to the portable electronic devices {i} at 200, the particular portable electronic device X 103 receives the broadcast message at 202, and/or the particular portable electronic device X 103 computes the shared secret $A_X$ at 204. The manufacturer server 104 should be operable to securely manage and store the private key g 138 and the shared secrets {A}.

The function F is the same function F that is used by the particular portable electronic device X 103 to compute the shared secret $A_X$ at 204. Thus, for index i=X, the shared secret $A_i$ computed by the manufacturing server 104 at 206 as a function F of the private key g 138 and the public key $B_X$ is the same as the shared secret $A_X$ computed by the particular portable electronic device X 103 at 204 as a function F of the public key G 136 and the private key by, that is $A_X = F(B_X, g) = F(G, b_X)$.

The manufacturing server 104 possesses or has access to one or more identifiers associated with each of the portable electronic devices {i}. For each of the portable electronic devices {i}, the manufacturing server 104 may compute a service-specific device identifier $ID_i$ from a service description value $C_Y$ associated with a service Y provided by the service entity 134 and one or more of the identifiers associated with that portable electronic device i. At 208, for each of the portable electronic devices {i}, the manufacturing server 104 provides to the service entity 134 the service-specific device identifier $ID_i$ and the corresponding shared secret $A_i$ of that portable electronic device i in any authentic and secure manner. For example, the manufacturing server 104 may use Pretty Good Privacy (PGP)® to encrypt the shared secrets $\{A_i\}$.

At 210, the service entity 134 receives from the manufacturing server 104 in the authentic and secure manner the service-specific device identifiers $\{ID_i\}$ and the corresponding shared secrets $\{A_i\}$ of the portable electronic devices {i}.

At 212, the particular shared secret $A_X$ can be used by the particular portable electronic device X 103 and by the service entity 134 providing the service Y to establish a trusted relationship therebetween. Although not explicitly shown, the particular portable electronic device X 103 may send a registration request to the service entity 134, where the registration request comprises a service-specific device identifier $ID_X$ that was computed from one or more of the identifiers of the particular portable electronic device X 103. The service entity 134 may use the shared secret $A_X$ corresponding to the service-specific device identifier $ID_X$ to authenticate the particular portable electronic device X 103, for example, using a message authentication code (MAC) algorithm, Menezes-Qu-Vanstone (MQV) authentication, challenge response authentication, or any other suitable authentication method.

A shared secret, such as the shared secret $A_X$, can be used as a symmetric key to encipher communication between the particular portable electronic device X 103 and the service entity 134. By way of example, shared secrets can be used in any way that symmetric key cryptography can be used. A shared secret is a key that can be used in encryption, decryption, Message Authentication Codes, and Challenge Response Authentication. The keys can also be used to derive other cryptographic keys. For example, the shared secret $A_X$ could be used to seed a hash to create other symmetric keys or public/private key pairs, using a Key Derivation Function (KDF).

Thus, multiple portable electronic devices {i} can be provisioned each with its own shared secret $A_i$ and, in one example, only a single communication (e.g. a broadcast message) is used to facilitate this provisioning. This is in contrast to a traditional Diffie-Hellman key exchange, which would require each of the portable electronic devices {i} to communicate its public key $B_i$ to the manufacturing server 104 in exchange for receiving the public key G 136 of the service entity 134.

The provisioning process described herein uses existing infrastructure and services, and thus does not require significant additional preparation and resources when provisioning multiple portable electronic devices {i} in the field, or after manufacturing. Copies of the public keys $\{B_i\}$ of the portable electronic devices {i} that are stored on the manufacturing database 106 are used to derive the shared secrets $\{A_i\}$ for use by the service entity 134.

As an alternative to having the manufacturing server 104 generate the public key G 136 and the private key g 138 on behalf of the service entity 134, and compute the shared secrets $\{A_i\}$ of the portable electronic devices {i}, the service entity 134 may perform these actions instead. This is illustrated in the flow diagram of FIG. 3, which shows a second procedure for provisioning a shared secret to a portable electronic device and to a service entity for establishing a trusted relationship therebetween. The procedure can apply to multiple portable electronic devices 100, although for ease of understanding, it is described with respect to the particular portable electronic device X 103.

Figure 3:
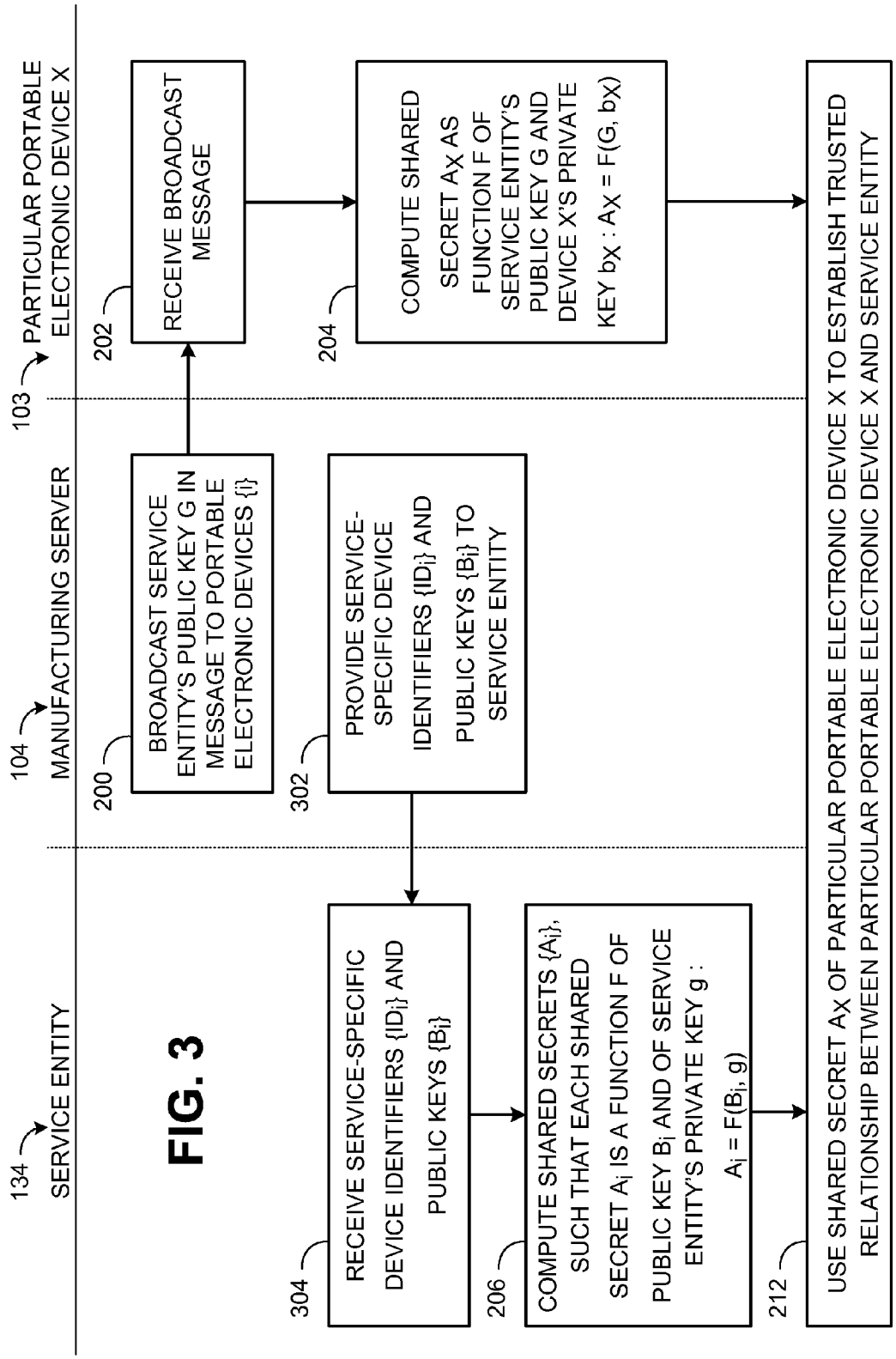
FIG. 3 is a flow diagram illustrating a second example procedure for provisioning a shared secret to a portable electronic device and to a service entity for establishing a trusted relationship therebetween.

Although not shown in FIG. 3, in the case that the public key G 136 and the private key g 138 are generated by the service entity 134, the service entity may provide the public key G 136 to the manufacturing server 104 for broadcasting.

Furthermore, in this case, the manufacturing server 104 need not be privy to the private key g 138 of the service entity 134.

At 200, the manufacturing server 104 broadcasts to one or more portable electronic devices {i} a message including the public key G 136 of the service entity 134. At 202, the particular portable electronic device X 103 receives the message, including the public key G 136 of the service entity 134, and at 204, the particular portable electronic device X 103 computes the shared secret $A_X$ as a function F of the service entity's public key G 136 and of a private key $b_X$ of its own cryptographic key pair $(B_X, b_X)$, that is $A_X=F(G, b_X)$.

As described with respect to FIG. 2, the manufacturing server 104 stores for each of the portable electronic devices {i} an association between an identifier of the portable electronic device i and the portable electronic device's public key $B_i$. For each of the portable electronic devices {i}, the manufacturing server 104 provides to the service entity 134 the service-specific device identifier $ID_i$ of the portable electronic device i and the corresponding public key $B_i$ of the key pair $(B_i, b_i)$ of portable electronic device i, as shown at 302. This may be done for any of the portable electronic devices {i} at any time before, during or after the manufacturing server broadcasts the service entity's public key G in a message to the portable electronic devices {i} at 200, the particular portable electronic device X 103 receives the broadcast message at 202, and/or the particular portable electronic device X 103 computes the shared secret $A_X$ at 204.

At 304, the service entity 134 receives from the manufacturing server 104 the service-specific device identifiers $\{ID_i\}$ and the corresponding public keys $\{B_i\}$ of the portable electronic devices {i}.

In contrast to the procedure illustrated in FIG. 2, in the procedure illustrated in FIG. 3, the service entity 134 performs the action at 206. That is, the service entity 134 computes for each of the portable electronic devices {i} the shared secret $A_i$ as a function F of the service entity's private key g 138 and of the public key $B_i$ of the portable electronic device i, such that $A_i=F(B_i, g)$. The function F is the same function F that is used by the particular portable electronic device X 103 to compute the shared secret $A_X$ at 204. Thus, for index i=X, the shared secret $A_i$ computed by the service entity 134 at 206 as a function F of the private key g 138 and the public key $B_X$ is the same as the shared secret $A_X$ computed by the particular portable electronic device X 103 at 204 as a function F of the public key G 136 and the private key by, that is $A_X=F(B_X, g)=F(G, b_X)$.

As before, the particular shared secret $A_X$ can be used by the particular portable electronic device X 103 and the service entity 134 to establish a trusted relationship therebetween, as shown at 212.

Although not shown in FIG. 3, as an alternative to having the manufacturing server 104 broadcast the message comprising the public key G 136 of the service entity 134, the service entity 134 may itself broadcast the public key G 136. In one example, the service entity 134 could broadcast the public key G 136 using existing infrastructure mechanisms for provisioning information to devices that use its services. For example, the service entity 134 could broadcast the public key G 136 as part of an upgrade of the service application. Depending on the setup of the service network, the service entity 134 may require the service-specific device identifiers $\{ID_i\}$ of the portable electronic devices {i} in order to broadcast the public key G 136 of the service entity 134 to the portable electronic devices {i}. For example, if the service entity 134 is in communication with the portable electronic devices {i} over a network such as the Internet, the service entity 134 may broadcast the public key G 136 to the portable electronic devices {i} by sending an individual message to a distinct network address of each portable electronic device i. Alternatively, if the service entity 134 is to broadcast the public key G 136 via a satellite or a radio tower, the service entity 134 may address a single message to "all", without requiring the service-specific device identifiers $\{ID_i\}$ of the portable electronic devices {i}. Furthermore, in either case, there is no need for the manufacturing server 104 to even be privy to the public key G 136 or the private key g 138 of the service entity 134.

Figure 4:
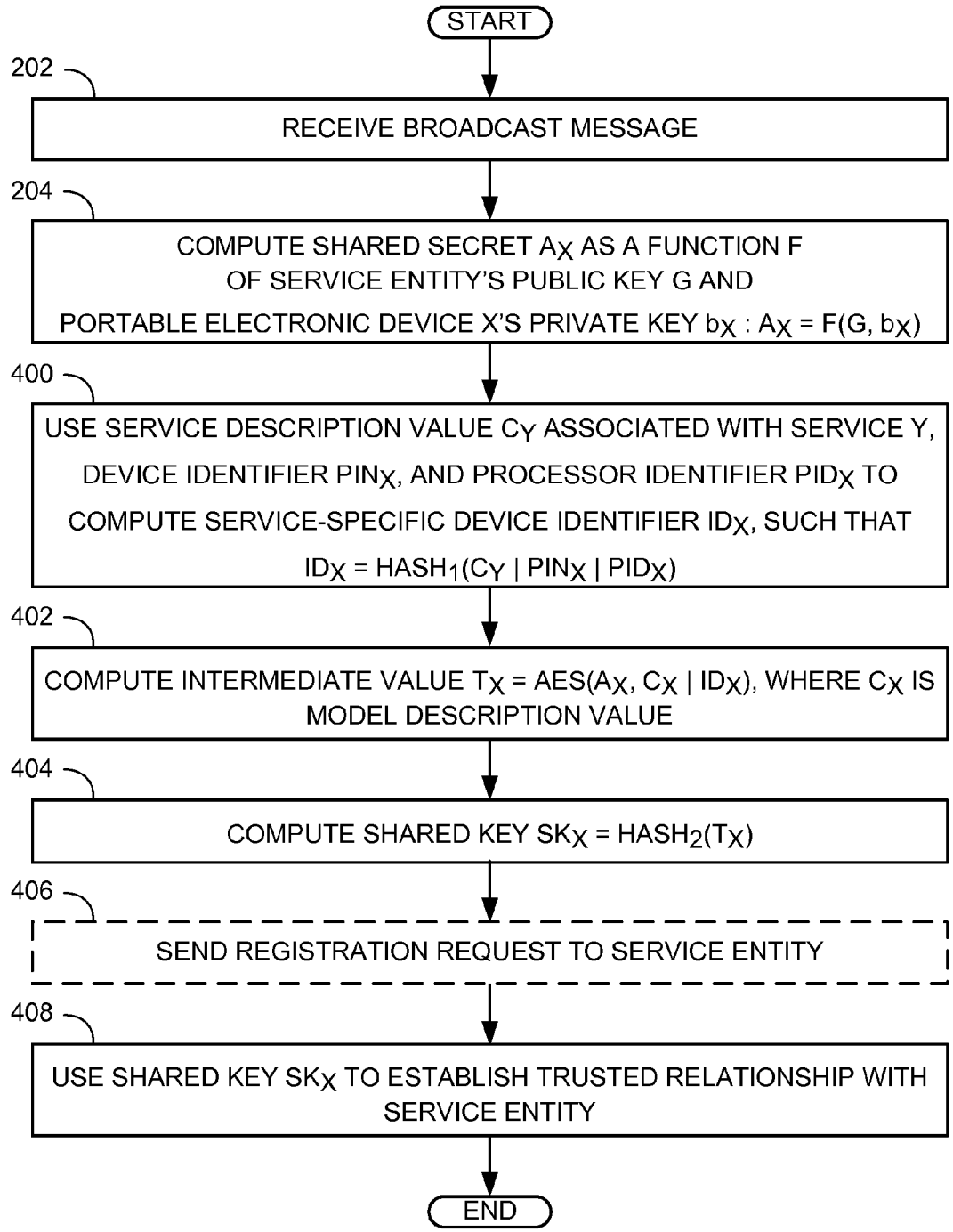
FIG. 4 is a flow diagram illustrating a first example method in a portable electronic device for determining a shared secret.

Turning to FIG. 4, a flow diagram illustrates a first example method in a portable electronic device for determining a shared secret.

As described with respect to FIGS. 2 and 3, at 202, the portable electronic device X receives a broadcast message comprising a public key G of a cryptographic key pair (G, g) of a service entity, where the broadcast message may be received from a manufacturing server or from the service entity itself. At 204, the portable electronic device X computes a shared secret $A_X$ as a function F of the public key G of the service entity key pair (G, g) and a private key by of the portable electronic device key pair $(B_X, b_X)$, that is $A_X=F(G, b_X)$.

The service application of the portable electronic device X may have access to one or more identifiers of the portable electronic device X, including, for example, a model description value $C_X$, a device identifier $PIN_X$, and a processor identifier $PID_X$, where at least one of the identifiers uniquely identifies the portable electronic device X. The service application also has access to a service description value $C_Y$ associated with the service Y provided by the service entity. In the case that a service entity provides more than one service, and a unique identifier is required or desired for each service, there may be a different service description value $C_Y$ associated with each service Y. At any time before, during or after receiving the broadcast message at 202 and computing the shared secret $A_X$ at 204, the portable electronic device X may use the service description value $C_Y$ along with one or more of its identifiers, where at least one of the identifiers uniquely identifies the portable electronic device X, to compute a service-specific device identifier that is statistically unique across the portable electronic devices {i} being tracked by the manufacturing server. In one example, as shown at 400, the portable electronic device X obtains a service-specific device identifier $ID_X$ of the portable electronic device X by applying a secure hash algorithm $HASH_1$ to a concatenation of its service description value $C_Y$, its device identifier $PIN_X$, and its processor identifier $PID_X$, such that $ID_X=HASH_1(C_Y|PIN_X|PID_X)$. This calculation results in a unique identifier $ID_X$ of fixed length that is specific to a particular service Y. As an alternative to the concatenation, any other combination of the values may be used, provided that both the portable electronic device X and the manufacturing server are privy to the nature of the combination. Additional values may be included in the combination, provided that all the values used are available to both the portable electronic device X and to the manufacturing server. Fewer values may be included in the combination, provided that the total length of the values to be hashed is sufficient for the hash algorithm used. Inclusion of the service description value $C_Y$ in the combination may ensure that the resulting service-specific identifier $ID_X$ is unique within the context of each service entity, such that no two services Y would possess the same service-specific identifier $ID_X$ for the device X, thereby protecting Personally Identifiable Information (PII). In one example, the hash algorithm $HASH_1$ used to compute the service-specific device identifier $ID_X$ is SHA256. However, another hash algorithm may be used, provided that it results in a unique value for the service-specific device identifier $ID_X$ and provides good protection against collisions. Other examples of hash functions include MD5, SHA1, SHA384, and SHA512.

Once the portable electronic device X is in possession of the service-specific device identifier $ID_X$ and the shared secret $A_X$, these values may be used to compute an intermediate value $T_X$. In one example, as shown at 402, the portable electronic device X applies an advanced encryption standard (AES) algorithm to the shared secret $A_X$ and a concatenation of the model description value $C_X$ and the service-specific device identifier $ID_X$, such that the intermediate value $T_X$=AES($A_X$, $C_X|ID_X$), where the vertical line "|" signifies concatenation, where $C_X|ID_X$ is the value to be encrypted by the AES algorithm and the shared secret $A_X$ is the key to be used to perform the AES encryption. As an alternative to the concatenation of the model description value $C_X$ and the service-specific device identifier $ID_X$, any other combination of these values or others may be used, provided that both the portable electronic device X and the entity responsible for computing the shared secrets for the portable electronic devices {i} (i.e., the manufacturing server or the service entity) are privy to the values being combined and the nature of the combination.

At 404, the portable electronic device X applies a secure hash algorithm $HASH_2$ to the intermediate value $T_X$ obtained at 402 in order obtain a shared key $SK_X$, which is a unique, fixed-length value that is dependent on the shared secret $A_X$. In one example, the hash algorithm $HASH_2$ used to compute the shared key $SK_X$ is SHA384. However, another hash algorithm may be used, such as MD5, SHA1, SHA256 or SHA512. It is noted that the AES algorithm results in a random set of data unique for a service Y for a specific device X.

At 406, the portable electronic device X may optionally send a request for registration to the service entity whose public key G was received in the broadcast message at 202. The portable electronic device X may then use its shared key $SK_X$ to attempt to establish a trusted relationship with the service entity, as shown at 408.

Figure 5:
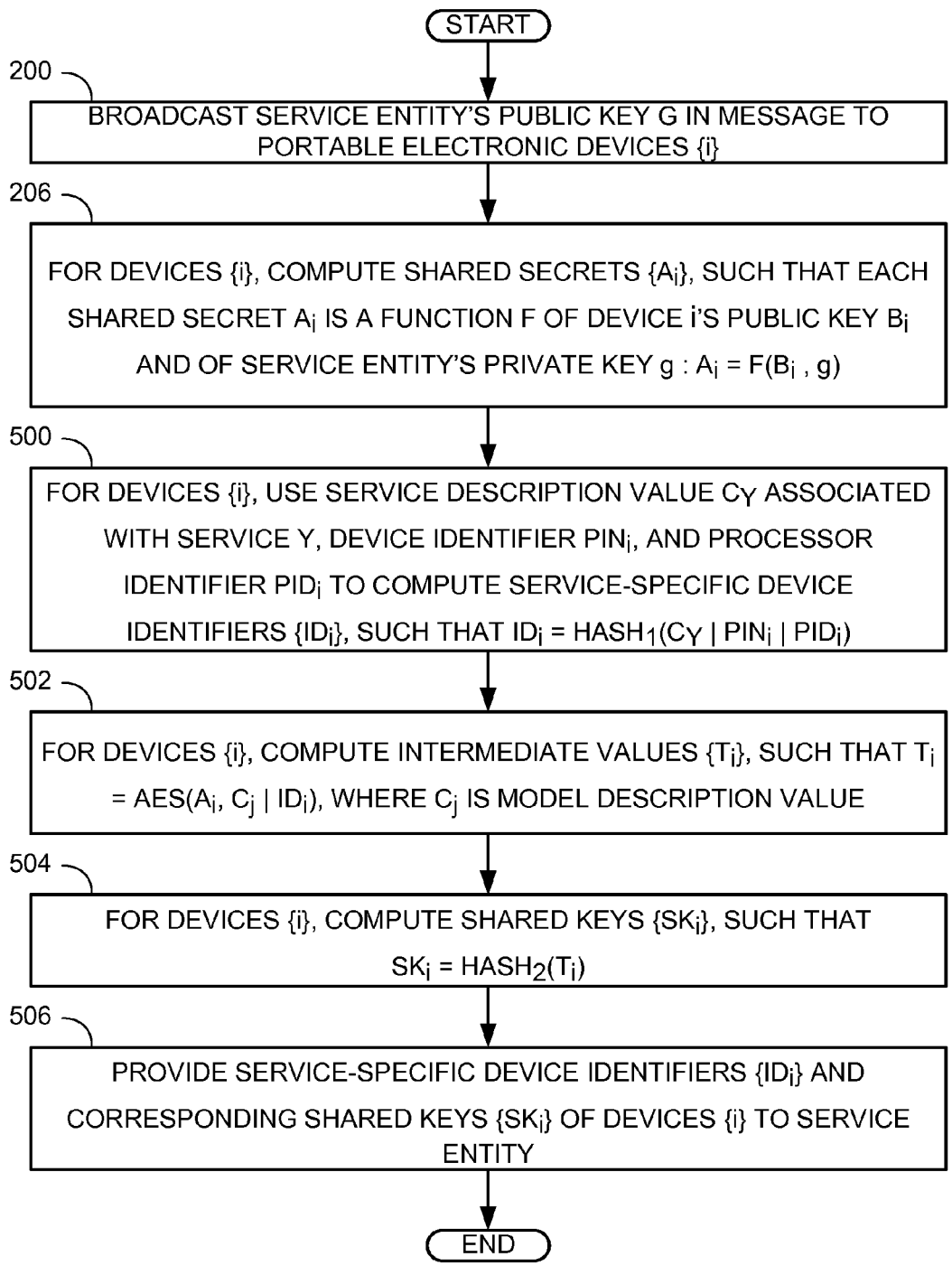
FIG. 5 is a flow diagram illustrating a first example method in a manufacturing server for provisioning a shared secret to a portable electronic device and to a service entity for establishing a trusted relationship therebetween.

Turning to FIG. 5, a flow diagram illustrates a first example method in a manufacturing server for provisioning a shared secret to a portable electronic device and to a service entity for establishing a trusted relationship therebetween.

As described with respect to FIG. 2, at 200, the manufacturing server broadcasts to one or more portable electronic devices {i} a message comprising a public key G of a service entity key pair (G, g). The public key G and the private key g of the service entity may have been generated by the manufacturing server on behalf of the service entity. Alternatively, the public key G and the private key g may have been generated by the service entity itself. Although not shown in FIG. 5, in the case that the public key G and the private key g are generated by the service entity, the service entity may provide the public key G to the manufacturing server for broadcasting. Furthermore, in this case, the manufacturing server need not be privy to the private key g of the service entity.

For each of the portable electronic devices {i}, the manufacturing server computes at 206 a shared secret $A_i$ as a function F of the private key g of the service entity and the public key $B_i$ of the portable electronic device key pair ($B_i$, $b_i$), such that $A_i$=F($B_i$, g). Any of the shared secrets {$A_i$} may be computed before, during or after broadcasting the message at 200.

For each of the portable electronic devices {i}, the manufacturing server may be privy to one or more identifiers used by the portable electronic device i to compute its service-specific device identifier as shown at 400 of FIG. 4. For example, in addition to a service description value $C_Y$ that is associated the service Y provided by the service entity, the manufacturing server may also possess for each of the portable electronic devices {i} a model description value $C_j$ that identifies the model j of the portable electronic device i (where $C_j$ is constant across a set of portable electronic devices {i} of a common model j), a device identifier $PIN_i$ that uniquely distinguishes the portable electronic device i from all other portable electronic devices manufactured by the manufacturer, and a processor identifier $PID_i$ that uniquely distinguishes the processor in the portable electronic device i from all other processors manufactured by the manufacturer of the processor. At least one of the identifiers uniquely identifies a corresponding one of the portable electronic devices {i}. For each of the portable electronic devices {i}, the manufacturing server may use the service description value $C_Y$ along with one or more of the portable electronic device i's unique identifiers to compute a service-specific device identifier. Any of the service-specific device identifiers may be computed at any time before, during or after broadcasting the service entity's public key G in a message to the portable electronic devices {i} at 200 and computing the shared secrets {$A_i$} at 206. In one example, as shown at 500, the manufacturing server obtains a service-specific device identifier $ID_i$ of each of the portable electronic devices {i} by applying the secure hash algorithm $HASH_1$ to a concatenation of the service description value $C_Y$, the device identifier $PIN_i$, and the processor identifier $PID_i$, such that $ID_i$=$HASH_1$($C_Y|PIN_i|PID_i$). The computation performed by the manufacturing server at 500 for each of the portable electronic devices {i} is identical to the computation performed by a particular portable electronic device X at 400.

Once the manufacturing server is in possession of the service-specific device identifier $ID_i$ and the shared secret $A_i$ of each of the portable electronic devices {i}, the manufacturing server may use these values to compute an intermediate value $T_i$ for each of the portable electronic devices {i}. In one example, for each of the portable electronic devices {i}, the manufacturing server applies an AES algorithm to the shared secret $A_i$ and a concatenation of the model description value $C_j$ and the service-specific device identifier $ID_i$, such that the intermediate value $T_i$=AES($A_i$, $C_j|ID_i$), as shown at 502. The computation performed by the manufacturing server at 502 for each of the portable electronic devices {i} is identical to the computation performed by a particular portable electronic device X at 402.

At 504, the manufacturing server applies the secure hash algorithm $HASH_2$ to each intermediate value $T_i$ computed at 502 in order obtain a shared key $SK_i$ for each of the portable electronic devices {i}, where each shared key $SK_i$ depends on the corresponding shared secret $A_i$ of the portable electronic device i. The computation performed by the manufacturing server at 504 for each of the portable electronic devices {i} is identical to the computation performed by the particular portable electronic device X at 404.

Once the manufacturing server has computed the service-specific device identifiers {$ID_i$} and the shared keys {$SK_i$} of the portable electronic devices {i}, the manufacturing server may provide these values to the service entity, as shown at 506.

Figure 6:
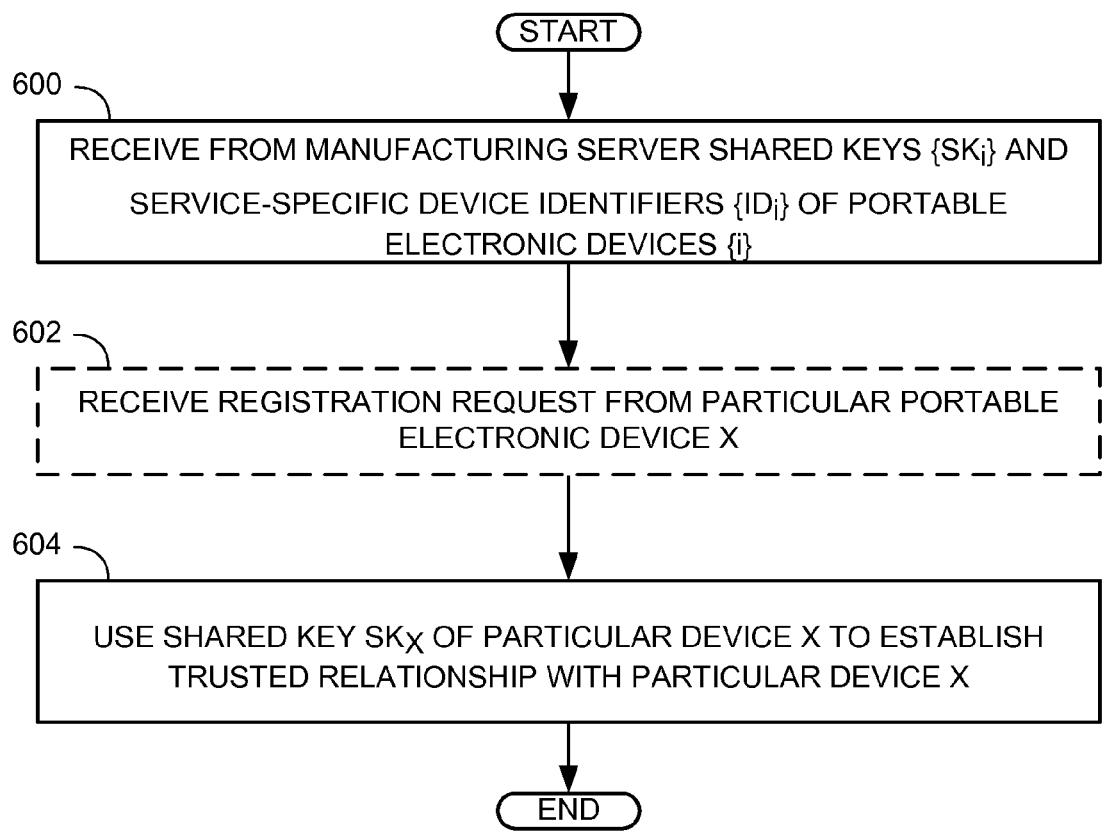
FIG. 6 is a flow diagram illustrating a first example method in a service entity for using a shared secret to establish a trusted relationship with a portable electronic device.

Turning to FIG. 6, a flow diagram illustrates a first example method in a service entity for using a shared secret to establish a trusted relationship with a particular portable electronic device X.

At 600, the service entity receives from the manufacturing server the shared keys {$SK_i$} and the corresponding service-specific device identifiers $\{ID_i\}$ of the portable electronic devices $\{i\}$. At 602, the service entity may receive a connection request or a request for registration from a particular portable electronic device X having a service-specific device identifier $ID_X$, where such a request might include the service-specific device identifier $ID_X$. The service entity may then use the shared key $SK_X$ of the portable electronic device X having the service-specific device identifier $ID_X$ to establish a trusted relationship with the particular portable electronic device X, as shown at 604.

Figure 7:
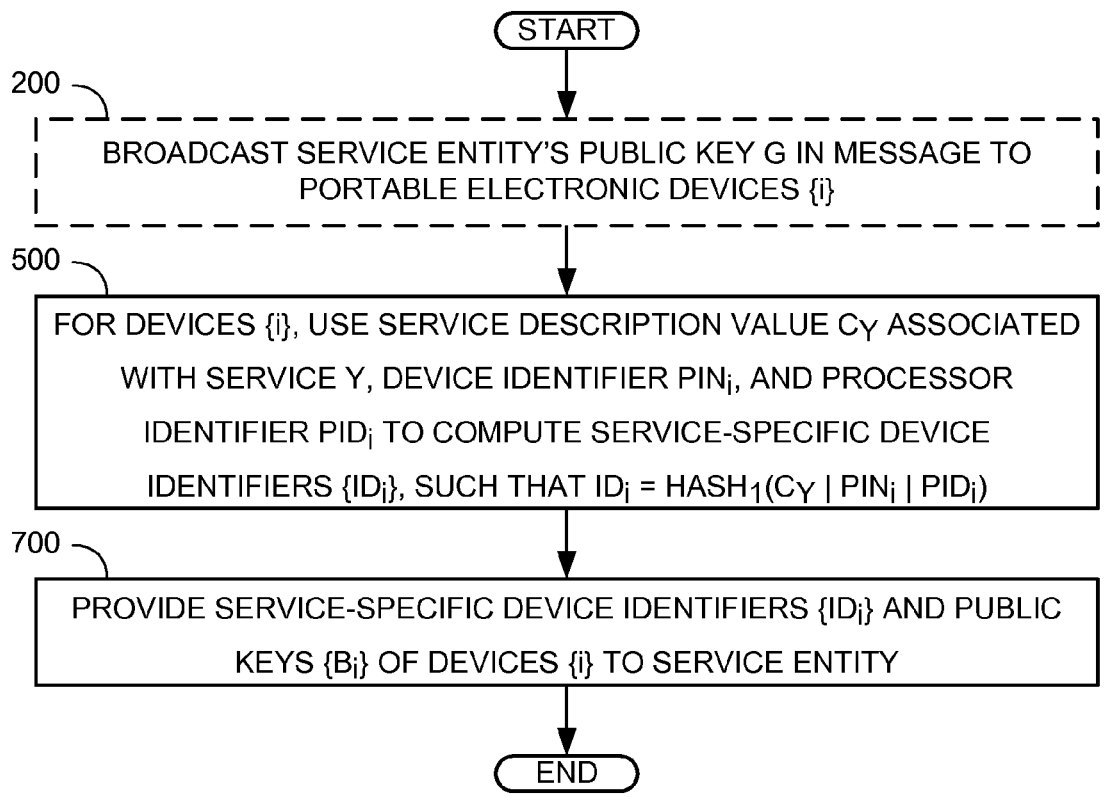
FIG. 7 is a flow diagram illustrating a second example method in a manufacturing server for provisioning a shared secret to a portable electronic device and to a service entity for establishing a trusted relationship therebetween.

As noted previously, as an alternative to having the manufacturing server compute the shared secrets $\{A_i\}$ for the portable electronic devices $\{i\}$ as shown in FIG. 5, the service entity may perform these computations instead. Accordingly, the flow diagram of FIG. 7 illustrates a second example method in a manufacturing server for provisioning a shared secret to a portable electronic device and to a service entity for establishing a trusted relationship therebetween.

At 200, the manufacturing server optionally broadcasts to one or more portable electronic devices $\{i\}$ a message including the public key G of the service entity. Alternatively, the service entity may itself broadcast the public key G, for example, using existing infrastructure mechanisms for provisioning information to devices that use its services. In one example, the service entity could broadcast the public key G as part of an upgrade of the service application. In the case that the service entity computes the shared secrets $\{A_i\}$ for the portable electronic devices $\{i\}$, the manufacturing server need not be privy to the private key g of the service entity.

The manufacturing server may compute a service-specific device identifier $ID_i$ for each of the portable electronic devices $\{i\}$ using one or more of the portable electronic device i's identifiers, as shown at 500. Any of the service-specific device identifiers $\{ID_i\}$ may be computed at any time before, during or after the optional broadcasting of the message comprising the public key G of the service entity. As noted previously, the computation performed for each of the portable electronic devices $\{i\}$ by the manufacturing server at 500 is identical to the computation performed by a particular portable electronic device X at 400.

For each of the portable electronic devices $\{i\}$, the manufacturing server provides to the service entity the service-specific device identifier $ID_i$ of the portable electronic device i and the corresponding public key $B_i$ of the portable electronic device key pair $(B_i, b_i)$, as shown at 700. By providing to the service entity the service-specific device identifiers $\{ID_i\}$ and corresponding public keys $\{B_i\}$ of the portable electronic devices $\{i\}$, the manufacturing server is providing the elements needed by the service entity to compute the shared secrets that will be used to establish a trusted relationship between the service entity and any of the portable electronic devices $\{i\}$.

Figure 8:
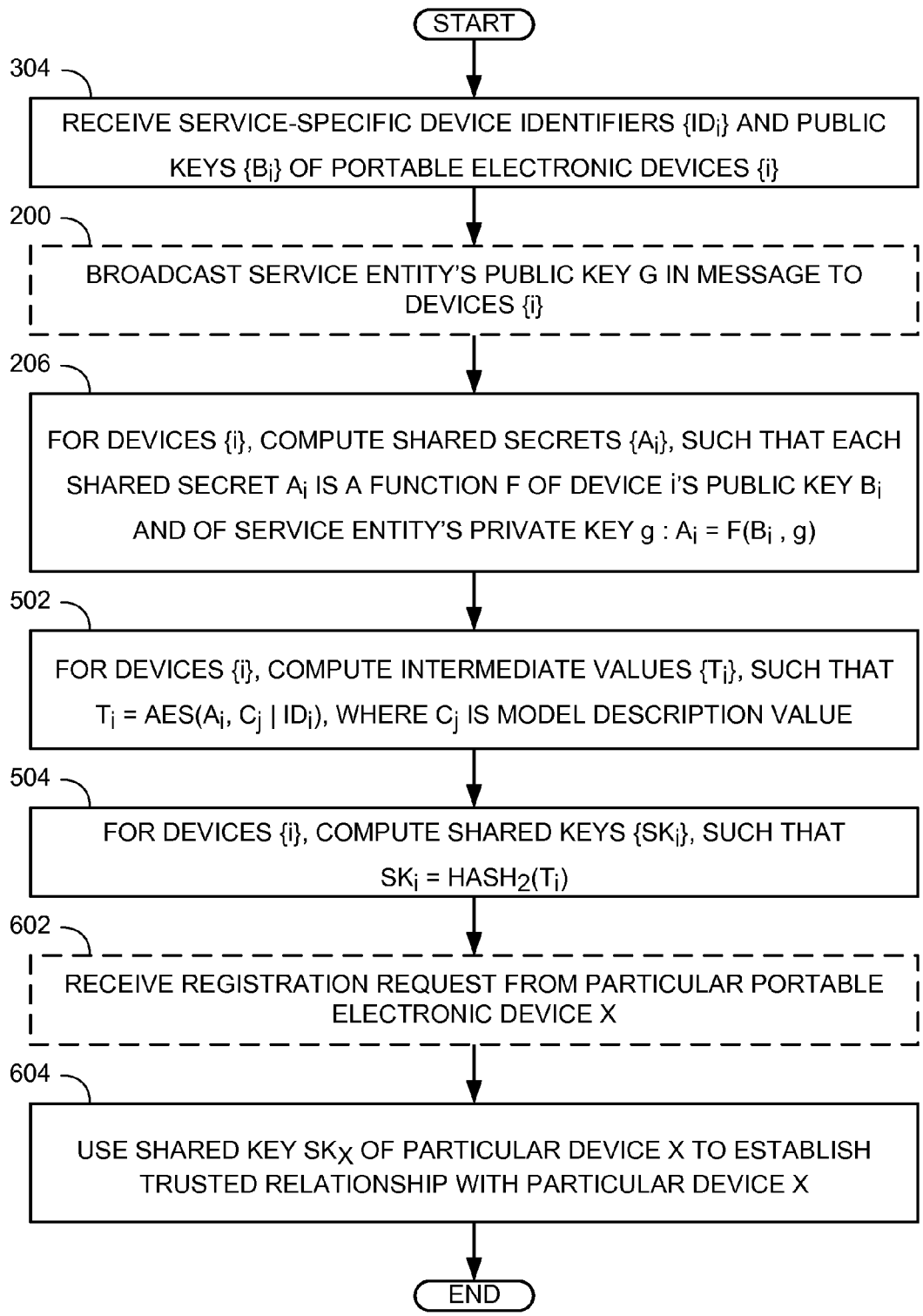
FIG. 8 is a flow diagram illustrating a second example method in a service entity for using a shared secret to establish a trusted relationship with a portable electronic device.

Turning to FIG. 8, a flow diagram illustrates a second example method in a service entity for using a shared secret to establish a trusted relationship with a particular portable electronic device X.

At 304, the service entity receives from the manufacturing server the service-specific device identifiers $\{ID_i\}$ and the corresponding public keys $\{B_i\}$ of the portable electronic devices $\{i\}$.

In the case that the public key G of the service entity has not been broadcast to the portable electronic devices $\{i\}$ by the manufacturing server as shown at 200 in FIG. 7, the service entity may use the service-specific device identifiers $\{ID_i\}$ to broadcast a message comprising the public key G of the service entity key pair (G, g) to the portable electronic devices $\{i\}$, as shown at 200 in FIG. 8.

Instead of having the manufacturing server compute the shared secrets $\{A_i\}$ at 206, compute the intermediate values $\{T_i\}$ at 502, and compute the shared keys $\{SK_i\}$ at 504 as illustrated in FIG. 5, these computations are performed by the service entity in the method of FIG. 8. That is, for each of the portable electronic devices $\{i\}$, the service entity computes the shared secret $A_i$ as a function F of the private key g of the service entity and the public key $B_i$ of the portable electronic device, such that $A_i = F(B_i, g)$. Any of the shared secrets $\{A_i\}$ may be computed at any time before, during or after the optional broadcasting of the message at 200.

Once the service entity is in possession of the service-specific device identifier $ID_i$ and the shared secret $A_i$ of each of the portable electronic devices $\{i\}$, the service entity may use these values to compute an intermediate value $T_i$ for each of the portable electronic devices $\{i\}$, for example, as shown at 502. The computation performed by the service entity at 502 for each of the portable electronic devices $\{i\}$ is identical to the computation performed by the particular portable electronic device X at 402. The service entity must be privy to any value(s) to be included in the computation of the intermediate values $\{T_i\}$. For example, in the case that the model description value $C_j$ is used to compute the intermediate value $T_i$, the model description values $\{C_j\}$ of the portable electronic devices $\{i\}$ should have been provided to the service entity by the manufacturing server, along with the service-specific device identifiers $\{ID_i\}$ and public keys $\{B_i\}$.

At 504, the service entity applies a secure hash algorithm $HASH_2$ to each intermediate value $T_i$ computed at 502 in order obtain a shared key $SK_i$ for each of the portable electronic devices $\{i\}$, where the shared key $SK_i$ is dependent on the corresponding shared secret $A_i$. The computation performed by the service entity at 504 for each of the portable electronic devices $\{i\}$ is identical to the computation performed by the particular portable electronic device X at 404.

At 602, the service entity may optionally receive a request for registration from a particular portable electronic device X having a service-specific device identifier $ID_X$. The service entity may then use the shared key $SK_X$ of the particular portable electronic device X to establish a trusted relationship with the particular portable electronic device X, as shown at 604.

The principles of provisioning of shared secrets as described herein can be used to mitigate difficulties associated with provisioning certificates to one or more portable electronic devices that are in the field (e.g. portable electronic devices for which the manufacturing process is complete). For example, if a public/private key pair is derived from the shared secret, the benefits of public key cryptography may be made available to the system, including the benefits of using public key cryptographic schemes based on certificates of trust. In the case of a public/private key pair being derived, the "service entity" from FIG. 1 can now produce a "device certificate". In other words, the service entity 134 can also be referred to as a trusted authority to the portable electronic device 100. In one example, the service entity 134 may publish a device certificate to the portable electronic device 100, and when in the field, the portable electronic device 100 may use the device certificate to register with the service entity 134. In another example, the device certificates may be published to a Lightweight Directory Access Protocol (LDAP) server or other type of simple online database. Any devices seeking a certificate may be informed of the location of the database and how to look up the certificate. For example, when registering with the service entity 134, the portable electronic device 100 may provide a unique identifier to the service entity 134, where the unique identifier corresponds to a certificate serial number and/or subject name of a certificate. The service entity 134 could then perform a public lookup back to the LDAP directory of certificates in order to retrieve the correct certificate. Alternatively, the portable electronic device 100 may be able to retrieve its own certificate from the directory. Either case avoids having to push the device certificate to the portable electronic device 100.

Figure 9:
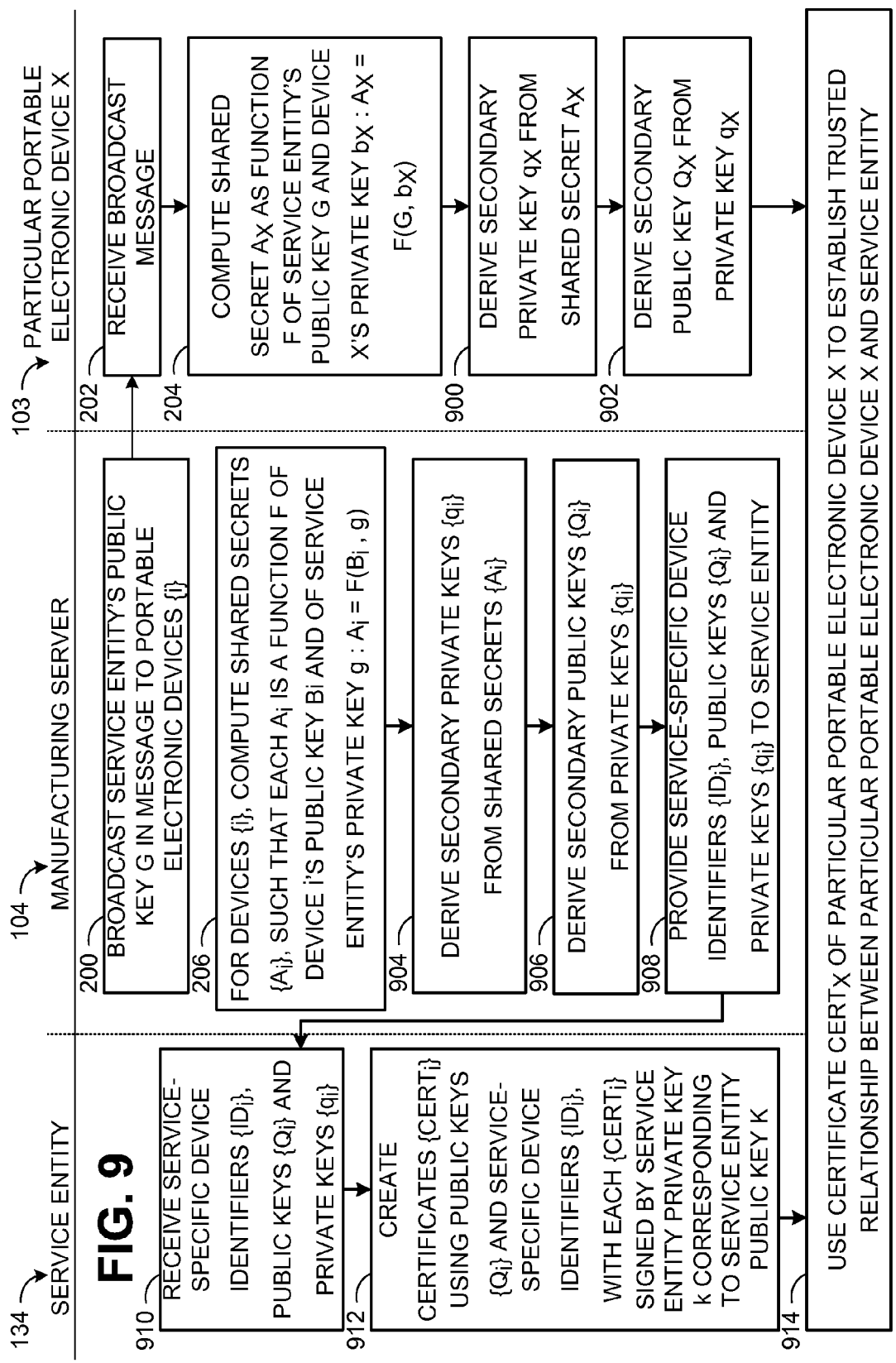
FIG. 9 is a flow diagram illustrating a first example procedure for provisioning a shared secret to a portable electronic device and to a service entity, the shared secret used to create a certificate to be used to establish a trusted relationship between the portable electronic device and the service entity.

Turning to FIG. 9, a flow diagram illustrates a first procedure for provisioning a shared secret to a portable electronic device and to a service entity, the shared secret used to create a certificate to be used to establish a trusted relationship between the portable electronic device and the service entity.

As described previously with respect to FIG. 2, the manufacturing server 104 may broadcast to one or more portable electronic devices {i} 100 a message comprising a public key G of the service entity key pair (G, g), as shown at 200. The particular portable electronic device X 103 may receive the message comprising the public key G 136 of the service entity 134, as shown at 202, and proceed at 204 to compute a shared secret $A_X$ as a function F of the public key G 136 of the service entity 134 and a private key $b_X$ of its own cryptographic key pair ($B_X$, $b_X$), that is $A_X=F(G, b_X)$.

The manufacturing server 104 stores for each of the portable electronic devices {i} 100 an association between an identifier of the portable electronic device i and the portable electronic device's public key $B_i$. The manufacturing server 104 computes at 206 a shared secret $A_i$ for each of the portable electronic devices {i}, where the shared secret $A_i$ is a function F of the private key g 138 of the service entity 134 and the public key $B_i$ of the portable electronic device i, that is $A_i=F(B_i, g)$. The function F is the same function F that is used by the particular portable electronic device X 103 to compute the shared secret $A_X$ at 204. Any of the shared secrets {$A_i$} may be computed by the manufacturing server 104 at any time before, during or after the manufacturing server broadcasts the service entity's public key G in a message to the portable electronic devices {i} at 200, the particular portable electronic device X 103 receives the broadcast message at 202, and/or the particular portable electronic device X 103 computes the shared secret $A_X$ at 204.

The particular portable electronic device X 103, upon computing the shared secret $A_X$ at 204, may derive a secondary private key $q_X$ from the shared secret $A_X$ as shown at 900. For example, the particular portable electronic device X 103 may set the secondary private key $q_X$ equal to the shared secret $A_X$.

Alternatively, the secondary private key $q_X$ may be derived by passing the shared secret $A_X$ through a function, such as a hash function or a truncation function, to set the data to a desired size. The desired size may be based on, for example, the desired size of the secondary private key $q_X$. The desired size may also be based on the RSA problem of generating primes using a pseudorandom number generator (PRNG) and Probabilistic Primality Test function. A PRNG is a deterministic algorithm which may take a small amount of random data as input and output an infinite amount of pseudo-random data. Provided that the initial input or seed value is unknown, it is not possible to guess the output pseudo-random data. When an RSA algorithm is used to generate cryptographic keys, two prime numbers P and Q are required to generate the integer field necessary for RSA to function properly. The traditional method of finding a prime number large enough for RSA to be secure requires testing for primality. In other words, after selecting a number that is expected to be a prime number, attempts are made to divide the selected number by every number between two and the square root of the selected number in order to determine if the selected number is indeed a prime number. This process is slow. Instead, RSA uses the Probabilistic Primality Test to quickly determine whether a number is "probably prime", within a certain degree of error. Two of these "probably prime" numbers may then be used to setup the field used for RSA computations. This is all standard procedure for generating cryptographic keys using the RSA algorithm. In the proposed example, the shared secret $A_X$ may be used as a seed value for the PRNG function. The pseudo-random numbers that are outputted by the PRNG function may be tested until two numbers are located that are "probably prime". These two numbers may be used to setup the RSA equations. Both sides of a communication channel may perform this process to arrive at the same values. However, no other devices will obtain the same values because they do not possess the shared secret $A_X$ that was used to seed the PRNG function. This process will differ for algorithms that do not use prime numbers, such as ECC and ElGamal algorithms. For these algorithms, the shared secret $A_X$ may be used directly to derive a private key.

The secondary private key $q_X$ may also be derived from other values, in addition to the shared secret $A_X$. For example, the derivation of the secondary private key $q_X$ may involve one or more of the portable electronic device X's identifiers, including the model description value $C_X$, the device identifier $PIN_X$, the processor identifier $PID_X$, a service-specific device identifier $ID_X$ such as that computed at 400 in FIG. 4, or any other values possessed by both the particular portable electronic device X 103 and the manufacturing server 104 or the service entity 134, such as the service description value $C_Y$ associated with the service Y, for example.

At 902, the particular portable electronic device X 103 may derive a secondary public key $Q_X$ from the secondary private key $q_X$. For example, the secondary public key $Q_X$ may be generated according to ECC methods.

Returning to the manufacturing server 104, upon computing the shared secrets {$A_i$} at 206, the manufacturing server 104 may, for each of the portable electronic devices {i}, derive a secondary private key $q_i$ from the shared secret $A_i$, as shown at 904. The manufacturing server 104 uses the same method to derive the secondary private key $q_i$ for each of the portable electronic devices {i} as that used by the particular portable electronic device X 103 to derive the secondary private key $q_X$ as shown at 900.

At 906, the manufacturing server 104 proceeds to derive a secondary public key $Q_i$ from each secondary private key $q_i$ that was derived at 904. This is done using the same algorithm employed by the particular portable electronic device X 103 to derive the secondary public key $Q_X$ at 902.

Once the manufacturing server 104 is in possession of the secondary private keys {$q_i$} and secondary public keys {$Q_i$} of the portable electronic devices {i}, for each one of the portable electronic devices {i}, the manufacturing server 104 provides to the service entity 134 a service-specific device identifier $ID_i$, secondary public key $Q_i$, and secondary private key $q_i$ of the portable electronic device i, as shown at 908.

Turning now to the service entity 134, following receipt of the service-specific device identifiers {$ID_i$}, secondary public keys {$Q_i$}, and secondary private keys {$q_i$} of the portable electronic devices {i} at 910, the service entity 134 proceeds to act as a trusted authority by creating a certificate $CERT_i$ for each of the portable electronic devices {i} using the secondary public key $Q_i$ and the service-specific device identifier $ID_i$ of the portable electronic device. In one example, the service entity possesses a public/private key pair consisting of a public key $K_S$ and a private key $k_S$, the service entity digitally signs the certificates {$CERT_i$} using its private key $k_S$ in accordance with standard public key infrastructure (PKI) functions.

A particular certificate $CERT_X$ can be used at 914 to establish a trusted relationship between the particular portable electronic device X 103 and the service entity 134. In one example, the certificates $\{CERT_i\}$ may be published to an LDAP server or other type of simple online database. Any devices {i} seeking a certificate may be informed of the location of the database and how to look up the certificate. For example, when registering with the service entity 134, the portable electronic device X 103 may provide a unique identifier to the service entity 134, where the unique identifier corresponds to a certificate serial number and/or subject name of the certificate $CERT_X$. The service entity 134 could then perform a public lookup back to the LDAP directory of certificates $\{CERT_i\}$ in order to retrieve the correct certificate $CERT_X$. Alternatively, the portable electronic device X 103 may be able to retrieve its own certificate $CERT_X$ from the directory. Either case avoids having to push the certificate $CERT_X$ to the portable electronic device X 103. The portable electronic device X 103 may be provisioned with the public key $K_S$ so that it can validate the certificate $CERT_X$.

It is noted that, traditionally, the private key of a key pair is generated using a random number generator, and key transport protocols are used to ensure that the trusted authority and the portable electronic devices {i} have the same keys. In contrast, when using the proposed technique, the private keys are deterministically derived from a shared secret that has been computed separately by both the trusted authority (i.e., the service entity) and the particular portable electronic device X. Thus, additional key transport protocols are not required.

It is also noted that, traditionally, a trusted certificate authority only possesses or has access to the public key that is to be included in the certificate, and uses an offline method to validate the identity of the owner of the certificate. The trusted certificate authority also requests proof of the owner's possession of the private key that corresponds to the public key that is to be included in the certificate, for example, by having the owner self-sign a certificate request. In contrast, when using the technique proposed in this document, validation is accomplished by the fact that the manufacturing server 104 attests that the portable electronic device X 103 possesses the secondary public key $Q_X$ and secondary private key $q_X$. This is made possible by the manufacturing server 104 deriving those secondary keys from the shared secret $A_X$, which in turn was previously computed using the provisioned keys of the portable electronic device X 103 and the service entity 134.

The shared secret can be used to develop public/private key pairs, where the public key algorithms are based on the intractability of the discrete logarithm problem. Examples of such algorithms include ECC algorithms and ElGamal algorithms. The shared secret can also be used in a function to seed a deterministic PRNG to derive RSA keys as described previously, or keys based on underlying mathematics of "integer factorization".

As an alternative to having the manufacturing server 104 derive the secondary private keys $\{q_i\}$ and secondary public keys $\{Q_i\}$, the keys may be derived by the service entity 134. Accordingly, the flow diagram of FIG. 10 illustrates a second procedure for provisioning a shared secret to a portable electronic device and to a service entity, the shared secret used to create a certificate to be used to establish a trusted relationship between the portable electronic device and the service entity.

The actions performed by the particular portable electronic device X 103 are the same as those performed in the procedure of FIG. 9, including receiving the broadcast message at 202, computing the shared secret $A_X$ at 204, deriving the secondary private key $q_X$ at 900 and deriving the second public key $Q_X$ at 902. As described with respect to FIG. 9, after broadcasting the message comprising the public key G of the service entity key pair (G, g) at 200, the manufacturing server 104 computes for each of the portable electronic devices {i} a shared secret $A_i$ as a function F of the private key g 138 of the service entity 134 and the public key $B_i$ of the portable electronic device i, that is $A_i=F(B_i, g)$, as shown at 206.

At 208, for each of the portable electronic devices {i}, the manufacturing server 104 provides to the service entity 134 the service-specific device identifiers $\{ID_i\}$ and the shared secrets $\{A_i\}$ of the portable electronic devices {i}.

Figure 10:
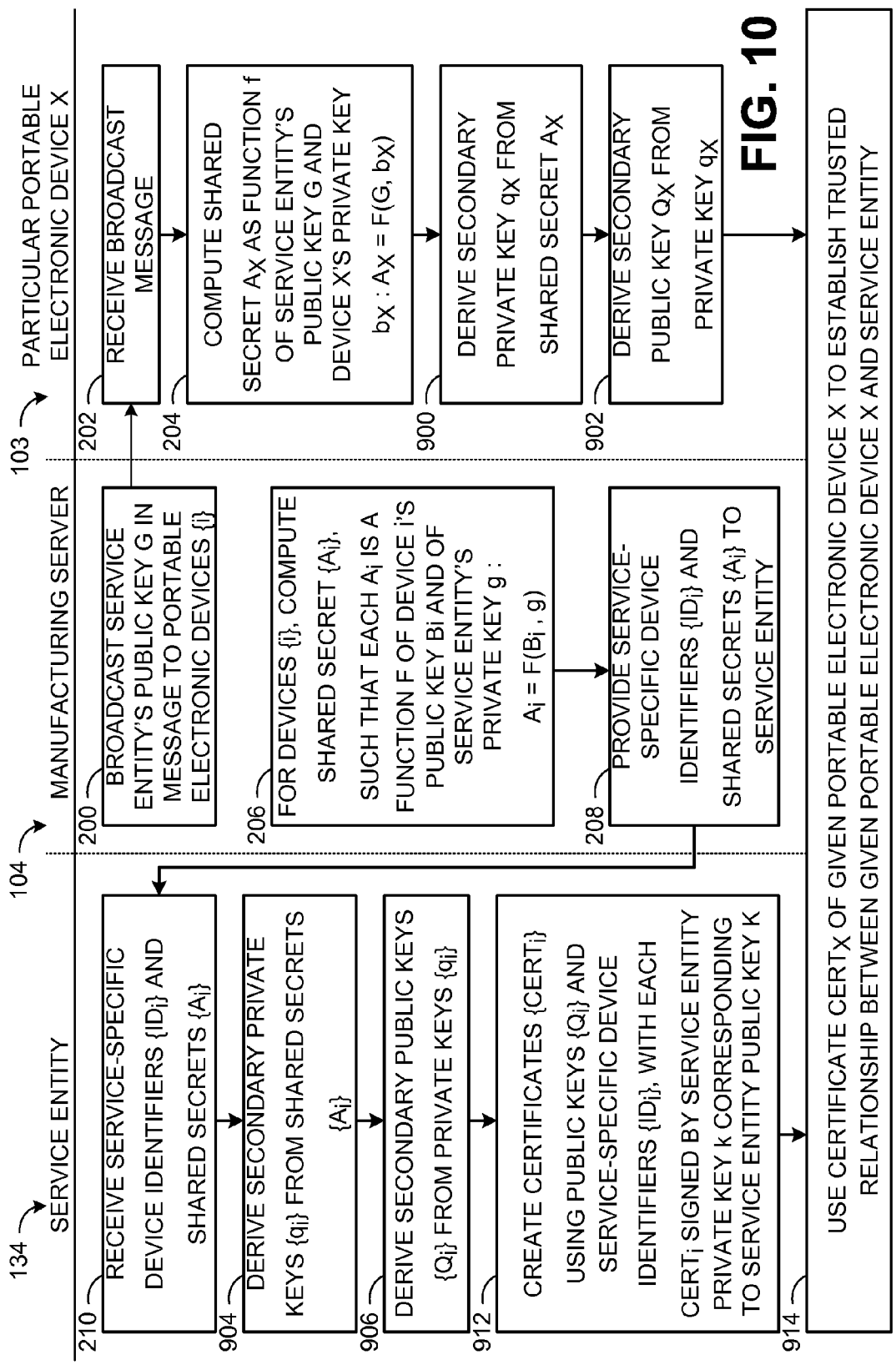
FIG. 10 is a flow diagram illustrating a second example procedure for provisioning a shared secret to a portable electronic device and to a service entity, the shared secret used to create a certificate to be used to establish a trusted relationship between the portable electronic device and the service entity.

Turning now to the service entity 134, in contrast to the procedure illustrated in FIG. 9, in the procedure illustrated in FIG. 10, the service entity 134 performs the actions at 904 and 906. That is, following receipt of the service-specific device identifiers $\{ID_i\}$ and the shared secrets $\{A_i\}$, as shown at 210, the service entity 134 derives for each of the portable electronic devices {i} a secondary private key $q_i$ from the shared secret $A_i$, as shown at 904. At 906, the service entity 134 proceeds to derive a secondary public key $Q_i$ from each secondary private key $q_i$ that was derived at 904.

Now, as described with respect to FIG. 9, the service entity 134 proceeds to act as a trusted authority by creating a certificate $CERT_i$ for each of the portable electronic devices {i} using the secondary public key $Q_i$ and the service-specific device identifier $ID_i$ of the portable electronic device. A particular certificate $CERT_X$ can be used at 914 to establish a trusted relationship between the particular portable electronic device X 103 and the service entity 134.

Figure 11:
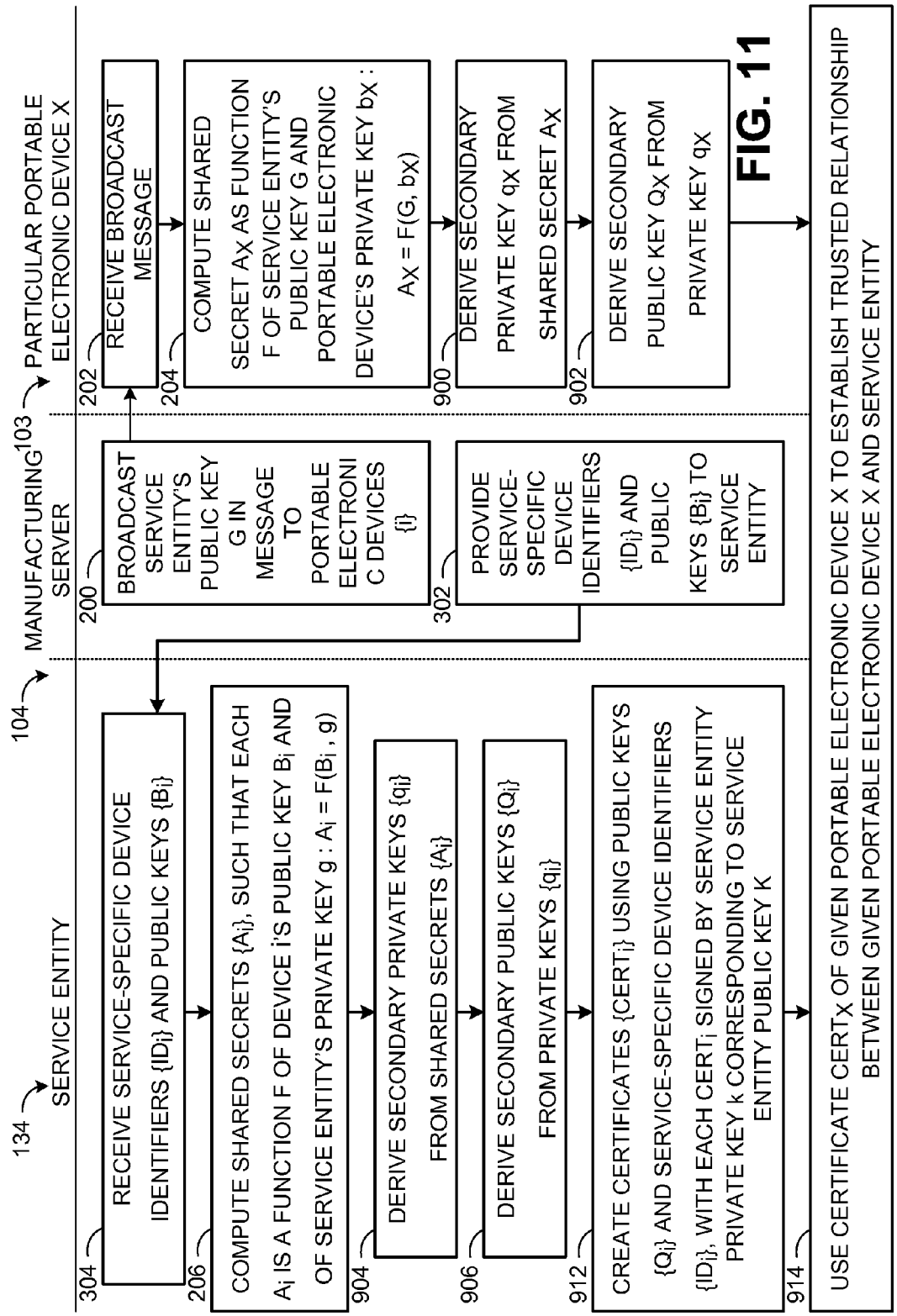
FIG. 11 is a flow diagram illustrating a third example procedure for provisioning a shared secret to a portable electronic device and to a service entity, the shared secret used to create a certificate to be used to establish a trusted relationship between the portable electronic device and the service entity.

A further alternative to the procedures described in FIGS. 9 and 10 is to have the service entity 134 compute the shared secrets $\{A_i\}$ from which the secondary private keys $\{q_i\}$ and the secondary public keys $\{Q_i\}$ are derived. Accordingly, the flow diagram of FIG. 11 illustrates a third procedure for provisioning a shared secret to a portable electronic device and to a service entity, the shared secret used to create a certificate to be used to establish a trusted relationship between the portable electronic device and the service entity.

The actions performed by the particular portable electronic device X 103 are the same as those performed in the procedures of FIGS. 9 and 10, including receiving the broadcast message at 202, computing the shared secret $A_X$ at 204, deriving the secondary private key $q_X$ at 900 and deriving the second public key $Q_X$ at 902. As described previously with respect to FIG. 3, the manufacturing server 104 optionally broadcasts a message comprising the public key G of the service entity key pair (G, g), as shown at 200. Although not shown, the message may alternatively be broadcast by the service entity 134.

For each of the portable electronic devices {i}, the manufacturing server 104 provides to the service entity 134 the service-specific device identifier $ID_i$ of the portable electronic device i and the corresponding public key $B_i$ of the key pair ($B_i$, $b_i$) of portable electronic device i, as shown at 302.

At 304, the service entity 134 receives from the manufacturing server 104 the service-specific device identifiers $\{ID_i\}$ and the corresponding public keys $\{B_i\}$ of the portable electronic devices {i}. In contrast to the procedures illustrated in FIGS. 9 and 10, in the procedure illustrated in FIG. 11, the service entity 134 performs the action at 206. That is, the service entity 134 computes for each of the portable electronic devices {i} the shared secret $A_i$ as a function F of the private key g 138 of the service entity 134 and the public key $B_i$ of the portable electronic device i, such that $A_i=F(B_i, g)$.

Once in possession of the shared secrets $\{A_i\}$, the service entity 134 derives for each of the portable electronic devices {i} a secondary private key $q_i$ from the shared secret $A_i$, as shown at 904. At 906, the service entity 134 proceeds to derive a secondary public key $Q_i$ from each secondary private key $q_i$ that was derived at 904.

Acting as a trusted authority, the service entity 134 proceeds to create a certificate $CERT_i$ for each of the portable electronic devices {i} using the secondary public key $Q_i$ and the service-specific device identifier $ID_i$ of the portable electronic device i, as shown at 912. A particular certificate $CERT_X$ can be used at 914 to establish a trusted relationship between the particular portable electronic device X 103 and the service entity 134.

Figure 12:
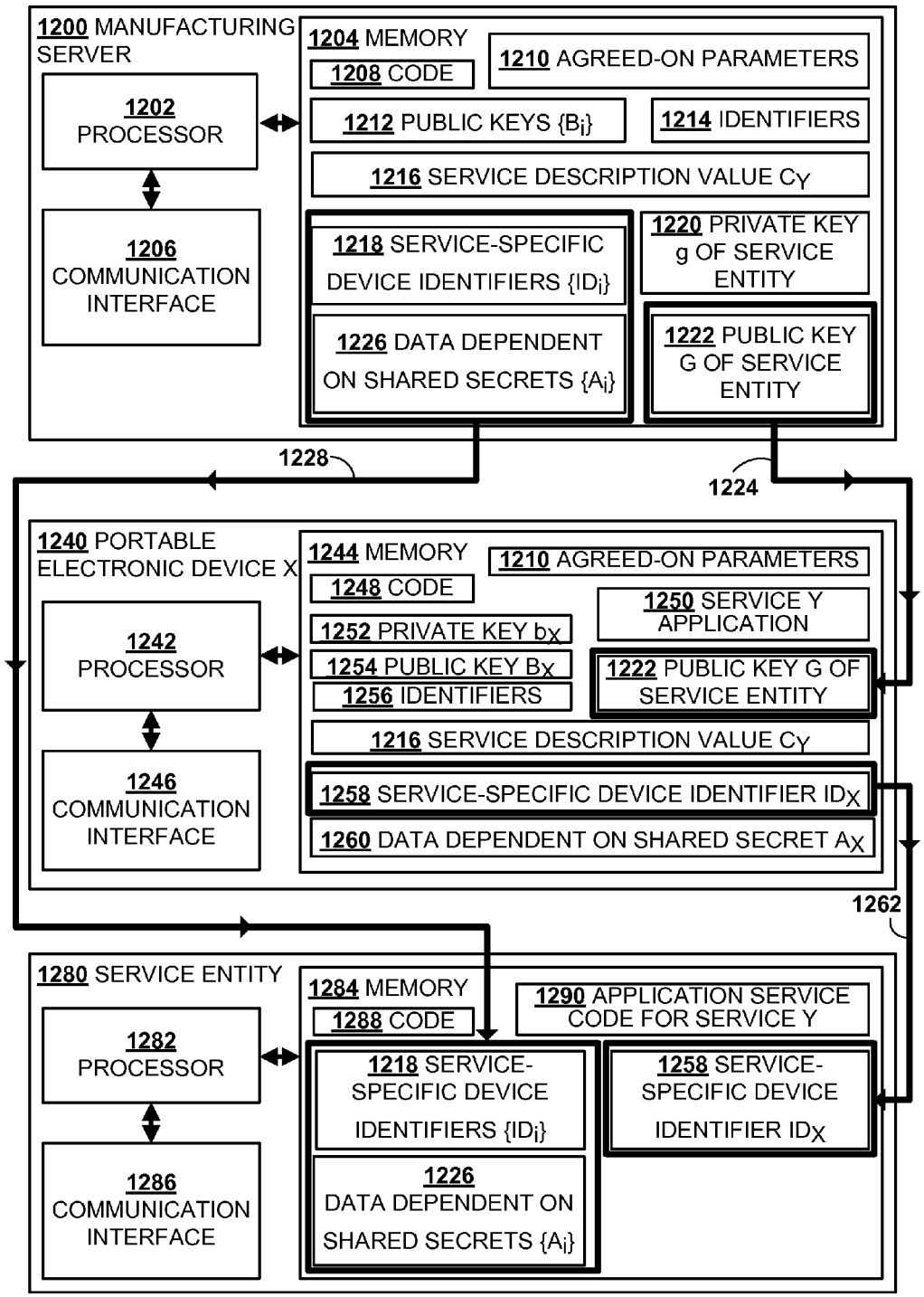
FIG. 12 is a block diagram of a first example manufacturing server, a first example portable electronic device and a first example service entity.

FIG. 12 is a block diagram of a first example manufacturing server 1200, a first example portable electronic device X 1240 and a first example service entity 1280. Any of the manufacturing server 1200, the portable electronic device X 1240 and the service entity 1280 may contain other elements which, for clarity, are not shown in FIG. 12.

The manufacturing server 1200 is an example of the manufacturing server 104. The manufacturing server 1200 comprises a processor 1202 which is coupled to a memory 1204 and to a communication interface 1206 through which it is able to communicate with one or more portable electronic devices, such as the portable electronic device X 1240.

The portable electronic device X 1240 is an example of any one of the portable electronic devices {i} 100. The portable electronic device X 1240 comprises a processor 1242 which is coupled to a memory 1244 and to a communication interface 1246.

The service entity 1280 is an example of the service entity 134. The service entity 1280 comprises a processor 1282 which is coupled to a memory 1284 and to a communication interface 1286.

Any of the communication interfaces 1206, 1246, and 1286 may comprise one or more wired communication interfaces or wireless communication interfaces or both. For example, communication interfaces 1206, 1246, and 1286 may comprise Universal Serial Bus (USB) interfaces, Ethernet interfaces, Integrated Services Digital Network (ISDN) interfaces, Digital Subscriber Line (DSL) interfaces, Local Area Network (LAN) interfaces, High-Definition Multimedia (HDMI) interfaces, Digital Visual Interfaces (DVIs), or Institute of Electrical and Electronics Engineers (IEEE) 1394 interfaces such as i.LINK™, Lynx$^{SM}$ or Firewire®. Alternatively, the communication interfaces 1206, 1246, and 1286 may comprise Wireless Local Area Network (WLAN) interfaces, short-range wireless communication interfaces such as Wireless Personal Area Network (WPAN) interfaces, Wireless Wide Area Network (WWAN) interfaces, or Wireless Metropolitan Area Network (WMAN) interfaces.

The memories 1204 and 1244 are able to store agreed-on parameters 1210 that have been agreed on by the manufacturing server 1200 and the portable electronic device X 1240. Such parameters may include, for example, a function F to be used to compute each shared secret $A_i$, a hash algorithm $HASH_1$ to be used to compute each hash of a combination comprising identifiers of each portable electronic device i to obtain each service-specific device identifier $ID_i$, an AES algorithm to be used to compute each intermediate value $T_i$ from the corresponding shared secret $A_i$ and a combination comprising identifiers and the corresponding service-specific device identifier $ID_i$, a hash algorithm $HASH_2$ to be used to compute each shared key $SK_i$ from the corresponding intermediate value $T_i$, and parameters indicative of the type and components of each combination to which a hash or AES algorithm is to be applied.

The memory 1204 of the manufacturing server 1200 is able to store code 1208 that, when executed by processor 1202, results in the example method illustrated in FIG. 5, and/or parts of the example methods illustrated in any of FIGS. 2, 9 and 10. The code 1208 may contain algorithms used to compute the service-specific device identifiers $\{ID_i\}$ 1218 and data 1226 dependent on the shared secrets $\{A_i\}$. The code 1208 may securely manage secrets and private keys. The memory 1204 may also store code for applications (not shown) installed in the manufacturing server 1200 to be executed by the processor 1202. Examples of such applications include a digital rights management (DRM) stack initialization program.

In addition to the agreed-on parameters 1210, the memory 1204 is also able to store a plurality of public keys $\{B_i\}$ 1212 of portable electronic devices {i}, as well as one or more identifiers 1214 of each of the portable electronic devices {i}. The identifiers 1214 may include, for example, model description values $\{C_j\}$ (where portable electronic devices of the same model share the same model description value $C_j$), device identifiers $\{PIN_i\}$, and processor identifiers $\{PID_i\}$, where at least one of the identifiers 1214 uniquely identifies a corresponding portable electronic device i. The memory 1204 is also able to store a service description value $C_Y$ 1216 that is associated with a service Y provided by the service entity 1280. Although not explicitly shown, the memory 1204 may store additional service description values associated with other services and/or service entities. The memory 1204 is further able to store service-specific device identifiers $\{ID_i\}$ 1218, where each of the service-specific device identifiers $\{ID_i\}$ 1218 may be computed from some combination of the service description value $C_Y$ 1216 and at least one of the identifiers 1214 that uniquely identifies a corresponding portable electronic device i, where the nature of the combination is determined from the agreed-on parameters 1210 in combination with the code 1208.

The memory 1204 is also able to store a private key g 1220 and a corresponding public key G 1222 of the service entity 1280. Although not explicitly shown, the memory 1204 is able to store additional private keys and public keys of other service entities. In the case that the manufacturing server 1200 generates the private key g 1220 and public key G 1222 of the service entity 1280, the memory 1204 may store parameters used for their generation. For example, if the private key g 1220 and the public key G 1222 were generated using ECC techniques, the memory 1204 may store a random or pseudorandom number generator for generation of the private key g 1220, and elliptic curve domain parameters, including a base point L on the elliptic curve.

As denoted by arrow 1224, the public key G 1222 of the service entity 1280 is able to be broadcast by the manufacturing server 1200 to one or more portable electronic devices {i}, including the portable electronic device X 1240, where the public key G 1222 of the service entity 1280 may be stored in the memory 1244. While not explicitly shown, the public key G 1222 may be communicated by the manufacturing server 1200 via the communication interface 1206 and may be received by the portable electronic device X 1240 via the communication interface 1246.

The memory 1204 of the manufacturing server 1200 is able to store data 1226 dependent on the shared secrets $\{A_i\}$ of portable electronic devices {i}, including at least the shared secrets $\{A_i\}$ themselves, where each shared secret $A_i$ is computed from the private key g 1220 of the service entity 1280 and the public key $B_i$ 1212 of the corresponding portable electronic device i. The data 1226 dependent on the shared secrets $\{A_i\}$ of the portable electronic devices {i} may also include the intermediate values $\{T_i\}$, shared keys $\{SK_i\}$, secondary private keys $\{q_i\}$, and secondary public keys $\{Q_i\}$.

As denoted by arrow 1228, the service-specific device identifiers $\{ID_i\}$ 1218 and one or more subsets of the data 1226 dependent on the shared secrets $\{A_i\}$ of the portable electronic devices $\{i\}$ are able to be communicated by the manufacturing server 1200 to the service entity 1280, where they may be stored in the memory 1284 of the service entity 1280. For example, the subset of the data 1226 that is communicated to the service entity 1280 may include the shared secrets $\{A_i\}$. Alternatively, the subset of the data 1226 that is communicated to the service entity 1280 may include the shared keys $\{SK_i\}$. In another example, the subsets of the data 1226 that are communicated to the service entity 1280 may include the secondary private keys $\{q_i\}$ and the secondary public keys $\{Q_i\}$. While not explicitly shown, the service-specific device identifiers $\{ID_i\}$ 1218 and the one or more subset of the data 1226 dependent on the shared secrets $\{A_i\}$ of the portable electronic devices $\{i\}$ may be sent from the manufacturing server 1200 via the communication interface 1206 and may be received by the service entity 1280 via the communication interface 1286.

The memory 1244 is able to store a private key $b_X$ 1252 and a corresponding public key $B_X$ 1254 of the portable electronic device X 1240, as well as one or more identifiers 1256 of the portable electronic device X 1240. The one or more identifiers 1256 may include, for example, a model description value $C_X$, a device identifier $PIN_X$, and a processor identifier $PID_X$, where at least one of the identifiers 1256 uniquely identifies the portable electronic device X 1240. The memory 1244 is also able to store the service description value $C_Y$ 1216 associated with the service Y that is provided by the service entity 1280. The memory 1244 is further able to store a service-specific device identifier $ID_X$ 1258, where the service-specific device identifier $ID_X$ 1258 may be computed from some combination of the service description value $C_Y$ 1216 and at least one of the identifiers 1256 that uniquely identifies the portable electronic device X 1240, where the nature of the combination is determined from the agreed-on parameters 1210.

The memory 1244 of the portable electronic device X 1240 is able to store data 1260 dependent on a shared secret $A_X$ of the portable electronic device X 1240, including at least the shared secret $A_X$ itself, where the shared secret $A_X$ is computed from the public key G 1222 of the service entity 1280 and the private key $b_X$ 1252 of the portable electronic device X 1240. The data 1260 dependent on the shared secret $A_X$ of the portable electronic device X 1240 may also include one or more of an intermediate value $T_X$, a shared key $SK_X$, a secondary private key $q_X$, and a secondary public key $Q_X$.

The memory 1244 of the portable electronic device X 1240 is able to store code 1248 and a service application 1250 for the service Y that is provided by the service entity 1280, where some combination of the code 1248 and the service application 1250, when executed by processor 1242, results in the example method illustrated in FIG. 4, and/or parts of the example methods illustrated in any of FIGS. 2, 3, 9, 10, and 11. In one example, the code 1248 may contain algorithms that are applied to data specific to the portable electronic device X 1240. The code 1248 may securely manage any of the private key $b_X$ 1252, the shared key $SK_X$, the shared secret $A_X$, and the secondary private key $q_X$. The algorithms contained in the code 1248 may hide temporary items such as the intermediate value $T_X$. The service application 1250 may manage details specific to the service entity 1280, including, for example, the public key G 1222, the service description value $C_Y$ 1216 associated with the service Y, and which algorithm in the code 1248 is to be called to for a given computation. For example, the service application 1250 may call the desired algorithms in the code 1248, pass in the required parameters, and, in turn, may receive parameters such as the service-specific device identifier $ID_X$ 1258, which may then be used for interacting with the service entity 1280. Private keys such as the private key $b_X$ 1252 and the secondary private key $q_X$ may be used via functional interfaces in the code 1248, but not revealed in plain text to the service application 1250. In one example, the service application 1250 is responsible for the role played by the portable electronic device X 1240 in establishing a trusted relationship with the service entity 1280, for example, by using the shared secret $A_X$ as shown at 212, or sending the registration request and using the shared key $SK_X$ as shown at 406 and 408, respectively, or using the certificate $CERT_X$ as shown at 914. The memory 1244 may also store code for additional applications (not shown) installed in the portable electronic device X 1240 to be executed by the processor 1242. Examples of such applications include data communication applications, voice communication applications, messaging applications, games, calculators, and the like.

As denoted by arrow 1262, the service-specific device identifier $ID_X$ 1258 of the portable electronic device X 1240 is able to be communicated by the portable electronic device X 1240 to the service entity 1280, for example, as part of a registration request, where the service entity 1280 may store it in the memory 1284. While not explicitly shown, the service-specific device identifier $ID_X$ 1258 of the portable electronic device X 1240 may be sent from the portable electronic device X 1240 via the communication interface 1246 and may be received by the service entity 1280 via the communication interface 1286.

The memory 1284 of the service entity 1280 is able to store code 1288 and application service code 1290 for the service Y, where some combination of the code 1288 and the application service code 1290, when executed by the processor 1282, results in the example method illustrated in FIG. 6, and/or parts of the example methods illustrated in any of FIGS. 2, 9 and 10. In one example, the code 1288 may contain algorithms that are applied to data specific to the service entity 1280 and may securely manage secrets and private keys of the service entity 1280. The application service code 1290 for the service Y may manage communication with the service Y application 1250 stored on the portable electronic device X 1240. In one example, the application service code 1290 is responsible for the role played by the service entity 1280 in establishing a trusted relationship with the portable electronic device X 1240, for example, by using the shared secret $A_X$ as shown at 212, or receiving the registration request and using the shared key $SK_X$ as shown at 602 and 604, respectively, or using the certificate $CERT_X$ as shown at 914. The memory 1284 may also store code for applications (not shown) installed in the service entity 1280 to be executed by the processor 1282. Examples of such applications include applications responsible for authenticating portable electronic devices prior to delivering content from video streaming applications, audio streaming applications, electronic book subscription applications, and the like.

Figure 13:
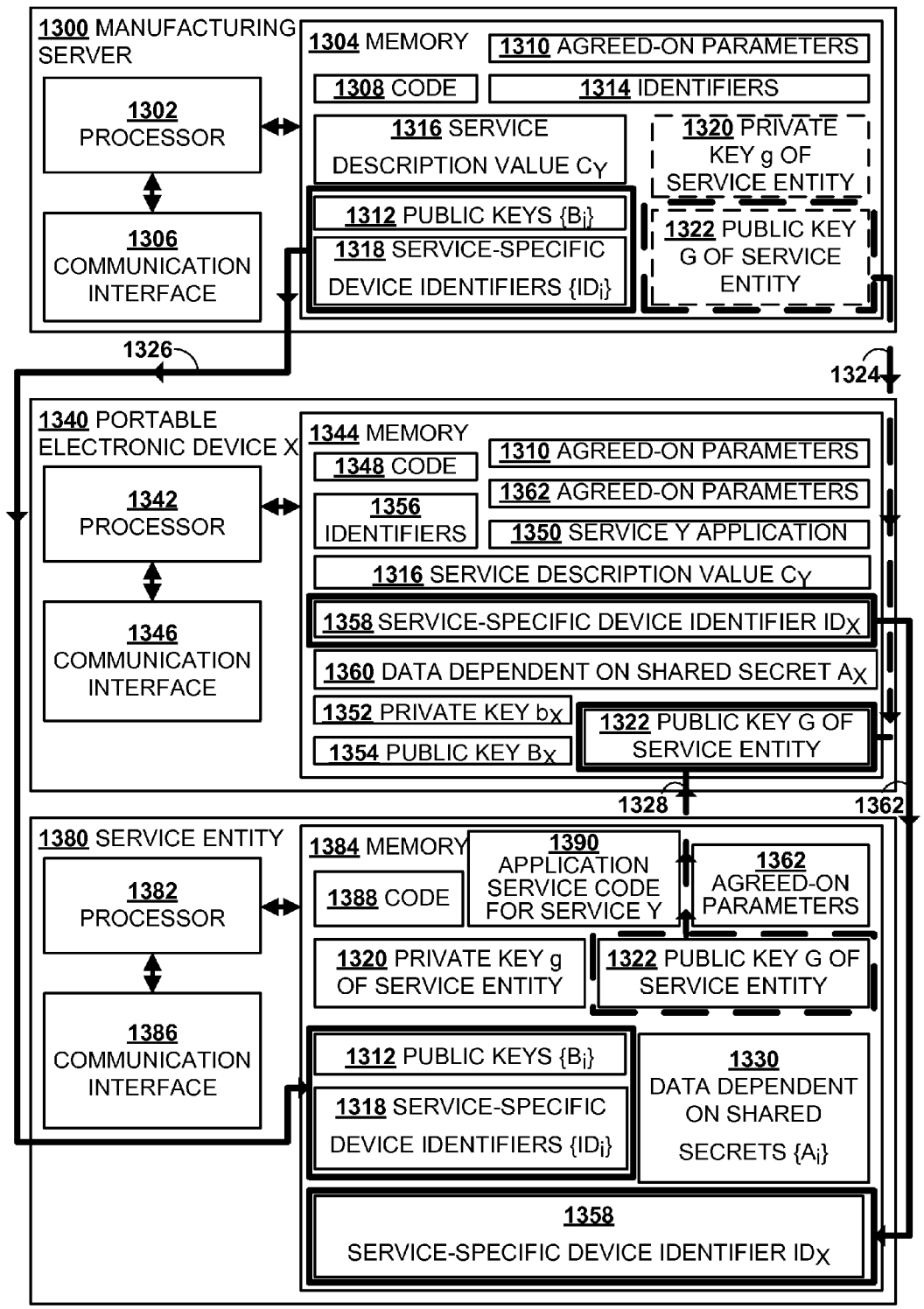
FIG. 13 is a block diagram of a second example manufacturing server, a second example portable electronic device and a second example service entity.

FIG. 13 is a block diagram of a second example manufacturing server 1300, a second example portable electronic device X 1340 and a second example service entity 1380. Any of the manufacturing server 1300, the portable electronic device X 1340 and the service entity 1380 may contain other elements which, for clarity, are not shown in FIG. 13.

The manufacturing server 1300 is an example of the manufacturing server 104. The manufacturing server 1300 comprises a processor 1302 which is coupled to a memory 1304 and to a communication interface 1306 through which it is able to communicate with one or more portable electronic devices, such as the portable electronic device X 1340.

The portable electronic device X 1340 is an example of any one of the portable electronic devices {i} 100. The portable electronic device X 1340 comprises a processor 1342 which is coupled to a memory 1344 and to a communication interface 1346.

The service entity 1380 is an example of the service entity 134. The service entity 1380 comprises a processor 1382 which is coupled to a memory 1384 and to a communication interface 1386.

Any of the communication interfaces 1306, 1346, and 1386 may comprise one or more wired communication interfaces or wireless communication interfaces or both. For example, communication interfaces 1306, 1346, and 1386 may comprise Universal Serial Bus (USB) interfaces, Ethernet interfaces, Integrated Services Digital Network (ISDN) interfaces, Digital Subscriber Line (DSL) interfaces, Local Area Network (LAN) interfaces, High-Definition Multimedia (HDMI) interfaces, Digital Visual Interfaces (DVIs), or Institute of Electrical and Electronics Engineers (IEEE) 1394 interfaces such as i.LINK™, Lynx$^{SM}$ or Firewire®. Alternatively, the communication interfaces 1306, 1346, and 1386 may comprise Wireless Local Area Network (WLAN) interfaces, short-range wireless communication interfaces such as Wireless Personal Area Network (WPAN) interfaces, Wireless Wide Area Network (WWAN) interfaces, or Wireless Metropolitan Area Network (WMAN) interfaces.

The memories 1304 and 1344 are able to store agreed-on parameters 1310 that have be agreed on by the manufacturing server 1300 and the portable electronic device X 1340. Such parameters may include, for example, a hash algorithm $HASH_1$ to be used to compute each hash of a combination comprising identifiers of each portable electronic device to obtain each service-specific device identifier $ID_i$, and parameters indicative of the type and components of the combination.

The memory 1304 of the manufacturing server 1300 is able to store code 1308 that, when executed by processor 1302, results in the example method illustrated in FIG. 7, and/or parts of the example methods illustrated in any of FIGS. 3 and 11. In one example, the code 1308 may contain algorithms used to compute the service-specific device identifiers {$ID_i$} 1318. The code 1308 may securely manage secrets and private keys. The memory 1304 may also store code for applications (not shown) installed in the manufacturing server 1300 to be executed by the processor 1302. Examples of such applications include a DRM stack initialization program.

In addition to the agreed-on parameters 1310, the memory 1304 is also able to store a plurality of public keys {$B_i$} 1312 of portable electronic devices {i}, as well as one or more identifiers 1314 of each of the portable electronic devices {i}. The identifiers 1314 may include, for example, model description values {$C_j$} (where portable electronic devices of the same model share the same model description value $C_j$), device identifiers {$PIN_i$}, and processor identifiers {$PID_i$}, where at least one of the identifiers 1314 uniquely identifies a corresponding portable electronic device i. The memory 1304 is also able to store a service description value $C_Y$ 1316 that is associated with a service Y provided by the service entity 1380. Although not explicitly shown, the memory 1304 may store additional service description values associated with other services and/or service entities. The memory 1304 is further able to store service-specific device identifiers {$ID_i$} 1318, where each of the service-specific device identifiers {$ID_i$} 1318 may be computed from some combination of the service description value $C_Y$ 1316 and at least one of the identifiers 1314 that uniquely identifies a corresponding portable electronic device i, where the nature of the combination is determined from the agreed-on parameters 1310 in combination with the code 1308.

The memory 1304 is optionally able to store a private key g 1320 and a corresponding public key G 1322 of the service entity 1380. Although not explicitly shown, the memory 1304 is optionally able to store additional private keys and public keys of other service entities. The private key g 1320 and the public key G 1322 of the service entity 1380 may have been received from the service entity 1380 via the communication interface 1306.

In the case that the manufacturing server 1300 possesses the public key G 1322 of the service entity 1380, the public key G 1322 of the service entity 1380 is able to be broadcast by the manufacturing server 1300 to one or more portable electronic devices {i}, including the portable electronic device X 1340, as denoted by arrow 1324, where the public key G 1322 of the service entity 1380 may be stored in the memory 1344. While not explicitly shown, the public key G 1322 may be communicated by the manufacturing server 1300 via the communication interface 1306 and may be received by the portable electronic device X 1340 via the communication interface 1346.

As denoted by arrow 1326, the service-specific device identifiers {$ID_i$} 1318 of the portable electronic devices {i} and the public keys {$B_i$} 1312 of the portable electronic devices {i} are able to be communicated by the manufacturing server 1300 to the service entity 1380, where they may be stored in the memory 1384 of the service entity 1380. While not explicitly shown, the service-specific device identifiers {$ID_i$} 1318 and the public keys {$B_i$} 1312 of the portable electronic devices {i} may be sent from the manufacturing server 1300 via the communication interface 1306 and may be received by the service entity 1380 via the communication interface 1386.

The memory 1384 of the service entity 1380 is able to store code 1388 and application service code 1390 for the service Y, where some combination of the code 1388 and the application service code 1390, when executed by the processor 1382, results in the example method illustrated in FIG. 8, and/or parts of the example methods illustrated in any of FIGS. 3 and 11. In one example, the code 1388 may contain algorithms that are applied to data specific to the service entity 1380 and may securely manage secrets and private keys of the service entity 1380. The application service code 1390 may manage communication with the service application 1350 stored on the portable electronic device X 1340. In one example, the application service code 1390 is responsible for the role played by the service entity 1380 in establishing a trusted relationship with the portable electronic device X 1340, for example, by using the shared secret $A_X$ as shown at 212, or receiving the registration request and using the shared key $SK_X$ as shown at 602 and 604, respectively, or using the certificate $CERT_X$ as shown at 914. The memory 1384 may also store code for applications (not shown) installed in the service entity 1380 to be executed by the processor 1382. Examples of such applications include applications responsible for authenticating portable electronic devices prior to delivering content from video streaming applications, audio streaming applications, electronic book subscription applications, and the like.

The memory 1384 of the service entity 1380 is able to store the private key g 1320 and the corresponding public key G 1322 of the service entity 1380. Although not explicitly shown, the memory 1384 may store parameters used for the generation of the private key g 1320 and the public key G 1322. For example, if the private key g 1320 and the public key G 1322 were generated using ECC techniques, the memory 1384 may store a random or pseudo-random number generator for generation of the private key g 1320, and elliptic curve domain parameters, including a base point L on the elliptic curve.

In the case that the manufacturing server 1300 is not responsible for broadcasting the public key G 1322 of the service entity 1380, the public key G 1322 of the service entity 1380 is able to be broadcast by the service entity 1380 itself to one or more portable electronic devices {i}, including the portable electronic device X 1340, as denoted by arrow 1328. While not explicitly shown, the public key G 1322 may be communicated by the service entity 1380 via the communication interface 1386 and may be received by the portable electronic device X 1340 via the communication interface 1346.

The memories 1344 and 1384 are able to store agreed-on parameters 1362 that have be agreed on by the portable electronic device X 1340 and the service entity 1380. Such parameters may include, for example, a function F to be used to compute each shared secret $A_i$, an AES algorithm to be used to compute each intermediate value $T_i$ from the corresponding shared secret $A_i$ and a combination comprising identifiers and the corresponding service-specific device identifier $ID_i$, a hash algorithm $HASH_2$ to be used to compute each shared key $SK_i$ from the corresponding intermediate value $T_i$, and parameters indicative of the type and components of the combination to which the AES algorithm is to be applied.

The memory 1384 of the service entity 1380 is able to store data 1330 dependent on the shared secrets $\{A_i\}$ of portable electronic devices {i}, including at least the shared secrets $\{A_i\}$ themselves, such that each shared secret $A_i$ is computed from the private key g 1320 of the service entity 1380 and the public key $B_i$ 1312 of the corresponding portable electronic device i. The data 1330 dependent on the shared secrets $\{A_i\}$ of the portable electronic devices {i} may also include the intermediate values $\{T_i\}$, shared keys $\{SK_i\}$, secondary private keys $\{q_i\}$, secondary public keys $\{Q_i\}$, and certificates $\{CERT_i\}$ created from the identifiers 1356 of the portable electronic devices {i} and the secondary public keys $\{Q_i\}$.

The memory 1344 is able to store a private key $b_X$ 1352 and a corresponding public key $B_X$ 1354 of the portable electronic device X 1340, as well as one or more identifiers 1356 of the portable electronic device X 1340. The one or more identifiers 1356 may include, for example, a model description value $C_X$, a device identifier $PIN_X$, and a processor identifier $PID_X$, where at least one of the identifiers 1356 uniquely identifies the portable electronic device X 1340. The memory 1344 is also able to store the service description value $C_Y$ 1316 associated with the service Y that is provided by the service entity 1380. The memory 1344 is further able to store a service-specific device identifier $ID_X$ 1358, where the service-specific device identifier $ID_X$ 1358 may be computed from some combination of the service description value $C_Y$ 1316 and at least one of the identifiers 1356 that uniquely identifies the portable electronic device X 1340, where the nature of the combination is determined from the agreed-on parameters 1310 in combination with the code 1348.

The memory 1344 of the portable electronic device X 1340 is able to store data 1360 dependent on a shared secret $A_X$ of the portable electronic device X 1340, including at least the shared secret $A_X$ itself, where the shared secret $A_X$ is computed from the public key G 1322 of the service entity 1380 and the private key $b_X$ 1352 of the portable electronic device X 1340. The data 1360 dependent on a shared secret $A_X$ of the portable electronic device X 1340 may also include one or more of an intermediate value $T_X$, a shared key $SK_X$, a secondary private key $q_X$, and a secondary public key $Q_X$.

The memory 1344 of the portable electronic device X 1340 is able to store code 1348 and a service application 1350 for the service Y that is provided by the service entity 1380, where some combination of the code 1348 and the service application 1350, when executed by processor 1342, results in the example method illustrated in FIG. 4, and/or parts of the example methods illustrated in any of FIGS. 3 and 11. In one example, the code 1348 may contain algorithms that are applied to data specific to the portable electronic device X 1340. The code 1348 may securely manage any of the private key $b_X$ 1352, the shared key $SK_X$, the shared secret $A_X$, and the secondary private key $q_X$. The algorithms contained in the code 1348 may hide temporary items such as the intermediate value $T_X$. The service application 1350 may manage details specific to the service entity 1380, including, for example, the public key G 1322, the service description value $C_Y$ 1316 associated with the service Y, and which algorithm in the code 1348 is to be called to for a given computation. For example, the service application 1350 may call the desired algorithms in the code 1348, pass in the required parameters, and, in turn, may receive parameters such as the service-specific device identifier $ID_X$ 1358, which may then be used for interacting with the service entity 1380. Private keys such as the private key $b_X$ 1352 and the secondary private key $q_X$ may be used via functional interfaces in the code 1348, but not revealed in plain text to the service application 1350. In one example, the service application 1350 is responsible for the role played by the portable electronic device X 1340 in establishing a trusted relationship with the service entity 1380, for example, by using the shared secret $A_X$ as shown at 212, or sending the registration request and using the shared key $SK_X$ as shown at 406 and 408, respectively, or using the certificate $CERT_X$ as shown at 914. The memory 1344 may also store code for additional applications (not shown) installed in the portable electronic device X 1340 to be executed by the processor 1342. Examples of such applications include data communication applications, voice communication applications, messaging applications, games, calculators, and the like.

As denoted by arrow 1362, the service-specific device identifier $ID_X$ 1358 of the portable electronic device X 1340 is able to be communicated by the portable electronic device X 1340 to the service entity 1380, for example, as part of a registration request, where the service entity 1380 may store it in the memory 1384. While not explicitly shown, the service-specific device identifier $ID_X$ 1358 of the portable electronic device X 1340 may be sent from the portable electronic device X 1340 via the communication interface 1346 and may be received by the service entity 1380 via the communication interface 1386.

What is claimed is:

1. A method to be performed by a manufacturing server, the method comprising:
   broadcasting via a communication interface of the manufacturing server a message to one or more portable electronic devices {i}, the message including a public key G of a service entity that provides a service Y; and
   for each portable electronic device i:
   computing at the manufacturing server a shared secret $A_i$ as a function F of a private key g corresponding to the public key G and of a public key $B_i$ of the portable electronic device i;
   computing at the manufacturing server a service-specific device identifier $ID_i$, associated with the service Y, of the portable electronic device i by applying a first hash function to a concatenation of a service description value $C_Y$ associated with the service Y and one or more identifiers of the portable electronic device i, wherein the identifiers comprise a device identifier $PIN_i$ and a processor identifier $PID_i$;

computing at the manufacturing server a value $T_i$ by applying an advanced encryption standard (AES) algorithm to the shared secret $A_i$ and to a combination of a model description value $C_j$ of the portable electronic device i and the service-specific device identifier $ID_i$;

computing at the manufacturing server a shared key $SK_i$ by applying a second hash function to the value $T_i$; and the manufacturing server providing the service-specific device identifier $ID_i$ and the shared key $SK_i$ to the service entity, wherein a trusted relationship is established between the service entity and the portable electronic device i using the service-specific device identifier $ID_i$ and the shared key $SK_i$.

2. The method as claimed in claim 1, further comprising, for each portable electronic device i:

deriving at the manufacturing server a secondary private key $q_i$ from the shared secret $A_i$; and deriving at the manufacturing server a secondary public key $Q_i$ from the secondary private key $q_i$.

3. The method as claimed in claim 1, wherein the message is a software update.

4. The method as claimed in claim 1, wherein the message is available from a mobile application store.

5. A method to be performed by a portable electronic device X, the method comprising:

receiving at a communication interface of the portable electronic device X a broadcast message comprising a public key G of a service entity that provides a service Y;

computing a shared secret $A_X$ as a function F of the public key G and of a private key $b_X$ of the portable electronic device X;

computing a service-specific device identifier $ID_X$, associated with the service Y, of the portable electronic device X by applying a first hash function to a concatenation of a service description value $C_Y$ associated with the service Y and one or more identifiers of the portable electronic device X, wherein the identifiers comprise a device identifier $PIN_X$ and a processor identifier $PID_X$;

computing a value $T_X$ by applying an advanced encryption standard (AES) algorithm to the shared secret $A_X$ and to a combination of a model description value $C_X$ of the portable electronic device X and the service-specific device identifier $ID_X$;

computing a shared key $SK_X$ by applying a second hash function to the value $T_X$; and establishing a trusted relationship between the portable electronic device X and the service entity using the service-specific device identifier $ID_X$ and the shared key $SK_X$.

6. The method as claimed in claim 5, further comprising:

deriving a secondary private key $q_X$ from the shared secret $A_X$; and deriving a secondary public key $Q_X$ from the secondary private key $q_X$.

7. The method as claimed in claim 5, further comprising:

sending, to the service entity, a registration request comprising the service-specific device identifier $ID_X$.

8. A method to be performed by a service entity providing a service Y, the method comprising:

receiving at a communication interface of the service entity, from a manufacturing server, public keys $\{B_i\}$ and corresponding service-specific device identifiers $\{ID_i\}$, associated with the service Y, for one or more portable electronic devices $\{i\}$, each service-specific device identifier $ID_i$ having been computed by applying a first hash function to a concatenation of a service description value $C_Y$ associated with the service Y and one or more identifiers of the portable electronic device i, wherein the identifiers comprise a device identifier $PIN_i$ and a processor identifier $PID_i$;

receiving at the communication interface of the service entity, from a particular portable electronic device X of the one or more portable electronic devices $\{i\}$, a registration request comprising a service-specific device identifier $ID_X$ of the particular portable electronic device X; and for each portable electronic device i:

computing a shared secret $A_i$ as a function F of a private key g, of the service entity, and of the public key $B_i$ of the portable electronic device i;

computing a value $T_i$ by applying an advanced encryption standard (AES) algorithm to the shared secret $A_i$ and to a combination of a model description value $C_j$ of the portable electronic device i and the service-specific device identifier $ID_i$;

computing a shared key $SK_i$ by applying a second hash function to the value $T_i$; and establishing a trusted relationship between the service entity and the particular portable electronic device X using a shared key $SK_X$ corresponding to the service-specific device identifier $ID_X$ of the particular portable electronic device X.

9. The method as claimed in claim 8, further comprising, for each portable electronic device i:

deriving a secondary private key $q_i$ from the shared secret $A_i$; and deriving a secondary public key $Q_i$ from the secondary private key $q_i$.

10. The method as claimed in claim 9, further comprising, for each portable electronic device i:

creating a certificate $CERT_i$ using the secondary public key $Q_i$ and the service-specific device identifier $ID_i$.

11. The method as claimed in claim 8, further comprising:

broadcasting a message to the one or more portable electronic devices $\{i\}$, the message including a public key G corresponding to the private key g of the service entity.

12. A method to be performed by a service entity providing a service Y, the method comprising:

receiving at a communication interface of the service entity, from a manufacturing server, service-specific device identifiers $\{ID_i\}$, associated with the service Y, and corresponding shared keys $\{SK_i\}$ for one or more portable electronic devices $\{i\}$, each service-specific device identifier $ID_i$ having been computed by the manufacturing server by applying a first hash function to a concatenation of a service description value $C_Y$ associated with the service Y and one or more identifiers of the portable electronic device i, wherein the identifiers comprise a device identifier $PIN_i$ and a processor identifier $PID_i$, and each shared key $SK_i$ having been computed by the manufacturing server by: computing a shared secret $A_i$ as a function F of a private key g, of the service entity, and of a public key $B_i$ of the portable electronic device i; computing a value $T_i$ by applying an advanced encryption standard (AES) algorithm to the shared secret $A_i$ and to a combination of a model description value $C_j$ of the portable electronic device i and the service-specific device identifier $ID_i$; and computing the shared key $SK_i$ by applying a second hash function to the value $T_i$;

receiving at the communication interface of the service entity, from a particular portable electronic device X of the one or more portable electronic devices {i}, a registration request comprising a service-specific device identifier $ID_X$ of the particular portable electronic device X; and establishing a trusted relationship between the service entity and the particular portable electronic device X using a shared key $SK_X$ that corresponds to the service-specific device identifier $ID_X$ of the particular portable electronic device X.

13. The method as claimed in claim 12, further comprising, for each portable electronic device i:

deriving a secondary private key $q_i$ from the shared secret $A_i$; and deriving a secondary public key $Q_i$ from the secondary private key $q_i$.

14. The method as claimed in claim 13, further comprising, for each portable electronic device i:

creating a certificate $CERT_i$ using the secondary public key $Q_i$ and the service-specific device identifier $ID_i$.

15. A manufacturing server comprising:

a processor;

a communication interface coupled to the processor; and a memory coupled to the processor, the memory storing code which, when executed by the processor, causes the processor to perform:

broadcasting via the communication interface a message to one or more portable electronic devices {i}, the message including a public key G of a service entity that provides a service Y; and for each portable electronic device i:

computing at the manufacturing server a shared secret $A_i$ as a function F of a private key g corresponding to the public key G and of a public key $B_i$ of the portable electronic device i;

computing at the manufacturing server a service-specific device identifier $ID_i$, associated with the service Y, of the portable electronic device i by applying a first hash function to a concatenation of a service description value $C_Y$ associated with the service Y and one or more identifiers of the portable electronic device i, wherein the identifiers comprise a device identifier $PIN_i$ and a processor identifier $PID_i$;

computing at the manufacturing server a value $T_i$ by applying an advanced encryption standard (AES) algorithm to the shared secret $A_i$ and to a combination of a model description value $C_j$ of the portable electronic device i and the service-specific device identifier $ID_i$;

computing at the manufacturing server a shared key $SK_i$ by applying a second hash function to the value $T_i$; and the manufacturing server providing the service-specific device identifier $ID_i$ and the shared key $SK_i$ to the service entity via the communication interface, wherein a trusted relationship is established between the service entity and the portable electronic device i using the service-specific device identifier $ID_i$ and the shared key $SK_i$.

16. The manufacturing server as claimed in claim 15, wherein the code, when executed by the processor, further causes the processor to perform, for each portable electronic device i:

deriving at the manufacturing server a secondary private key $q_i$ from the shared secret $A_i$; and deriving at the manufacturing server a secondary public key $Q_i$ from the secondary private key $q_i$.

17. A portable electronic device X comprising:

a processor;

a communication interface coupled to the processor through which a broadcast message is received, the broadcast message comprising a public key G of a service entity that provides a service Y; and a memory coupled to the processor, the memory storing code which, when executed by the processor, causes the processor to perform:

computing a shared secret $A_X$ as a function F of the public key G and of a private key $b_X$ of the portable electronic device X;

computing a service-specific device identifier $ID_X$, associated with the service Y, of the portable electronic device X by applying a first hash function to a concatenation of a service description value $C_Y$ associated with the service Y and one or more identifiers of the portable electronic device X, wherein the identifiers comprise a device identifier $PIN_X$ and a processor identifier $PID_X$;

computing a value $T_X$ by applying an advanced encryption standard (AES) algorithm to the shared secret $A_X$ and to a combination of a model description value $C_X$ of the portable electronic device X and the service-specific device identifier $ID_X$;

computing a shared key $SK_X$ by applying a second hash function to the value $T_X$; and establishing a trusted relationship between the portable electronic device X and the service entity using the service-specific device identifier $ID_X$ and the shared key $SK_X$.

18. The portable electronic device X as claimed in claim 17, wherein the code, when executed by the processor, further causes the processor to perform:

deriving a secondary private key $q_X$ from the shared secret $A_X$; and deriving a secondary public key $Q_X$ from the secondary private key $q_X$.

19. The portable electronic device X as claimed in claim 17, wherein the code, when executed by the processor, further causes the processor to perform:

sending, to the service entity, via the communication interface, a registration request comprising the service-specific device identifier $ID_X$.

20. A service entity providing a service Y, the service entity comprising:

a processor;

a communication interface coupled to the processor, through which the service entity receives, from a manufacturing server, public keys $\{B_i\}$ and corresponding service-specific device identifiers $\{ID_i\}$, associated with the service Y, for one or more portable electronic devices {i}, each service-specific device identifier $ID_i$ having been computed by applying a first hash function to a concatenation of a service description value $C_Y$ associated with the service Y and one or more identifiers of the portable electronic device i, wherein the identifiers comprise a device identifier $PIN_i$ and a processor identifier $PID_i$, and through which the service entity receives, from a particular portable electronic device X of the one or more portable electronic devices {i}, a registration request comprising a service-specific device identifier $ID_X$ of the particular portable electronic device X; and a memory coupled to the processor, the memory storing code which, when executed by the processor, causes the processor to perform, for each portable electronic device i:

computing a shared secret $A_i$ as a function F of a private key g, of the service entity, and of the public key $B_i$ of the portable electronic device i;

computing a value $T_i$ by applying an advanced encryption standard (AES) algorithm to the shared secret $A_i$ and to a combination of a model description value $C_j$ of the portable electronic device i and the service-specific device identifier $ID_i$; and computing a shared key $SK_i$ by applying a second hash function to the value $T_i$;

and establishing a trusted relationship between the service entity and the particular portable electronic device X using a shared key $SK_X$ corresponding to the service-specific device identifier $ID_X$ of the particular portable electronic device X.

21. The service entity as claimed in claim 20, wherein the code, when executed by the processor, further causes the processor to perform, for each portable electronic device i:

deriving a secondary private key $q_i$ from the shared secret $A_i$; and deriving a secondary public key $Q_i$ from the secondary private key $q_i$.

22. The service entity as claimed in claim 21, wherein the code, when executed by the processor, further causes the processor to perform, for each portable electronic device i:

creating a certificate $CERT_i$ using the secondary public key $Q_i$ and the service-specific device identifier $ID_i$.

23. The service entity as claimed in claim 20, wherein the code, when executed by the processor, further causes the processor to perform:

broadcasting via the communication interface a message to the one or more portable electronic devices {i}, the message including a public key G corresponding to the private key g of the service entity.

24. A service entity providing a service Y, the service entity comprising:

a processor;

a communication interface coupled to the processor, through which the service entity receives, from a manufacturing server, service-specific device identifiers $\{ID_i\}$, associated with the service Y, and corresponding shared keys $\{SK_i\}$ for one or more portable electronic devices {i}, each service-specific device identifier $ID_i$ having been computed by the manufacturing server by applying a first hash function to a concatenation of a service description value $C_Y$ associated with the service Y and one or more identifiers of the portable electronic device i, wherein the identifiers comprise a device identifier $PIN_i$ and a processor identifier $PID_i$, and each key $SK_i$ having been computed by the manufacturing server by: computing a shared secret $A_i$ as a function F of a private key g, of the service entity, and of a public key $B_i$ of the portable electronic device i; computing a value $T_i$ by applying an advanced encryption standard (AES) algorithm to the shared secret $A_i$ and to a combination of a model description value $C_j$ of the portable electronic device i and the service-specific device identifier $ID_i$; and computing the shared key $SK_i$ by applying a second hash function to the value $T_i$, and through which the service entity receives, from a particular portable electronic device X of the one or more portable electronic devices {i}, a registration request comprising a service-specific device identifier $ID_X$ of the particular portable electronic device X; and a memory coupled to the processor, the memory storing code which, when executed by the processor, causes the processor to perform:

establishing a trusted relationship between the service entity and the particular portable electronic device X using a shared key $SK_X$ that corresponds to the service-specific device identifier $ID_X$ of the particular portable electronic device X.

25. The service entity as claimed in claim 24, wherein the code, when executed by the processor, further causes the processor to perform, for each portable electronic device i:

deriving a secondary private key $q_i$ from the shared secret $A_i$; and deriving a secondary public key $Q_i$ from the secondary private key $q_i$.

26. The service entity as claimed in claim 25, wherein the code, when executed by the processor, further causes the processor to perform, for each portable electronic device i:

creating a certificate $CERT_i$ using the secondary public key $Q_i$ and the service-specific device identifier $ID_i$.

27. A non-transitory computer readable medium storing instructions which, when executed by a processor of a manufacturing server, cause the processor to perform:

broadcasting a message to one or more portable electronic devices {i}, the message including a public key G of a service entity that provides a service Y; and for each portable electronic device i:

computing a shared secret $A_i$ as a function F of a private key g corresponding to the public key G and of a public key $B_i$ of the portable electronic device i;

computing a service-specific device identifier $ID_i$, associated with the service Y, of the portable electronic device i by applying a first hash function to a concatenation of a service description value $C_Y$ associated with the service Y and one or more identifiers of the portable electronic device i, wherein the identifiers comprise a device identifier $PIN_i$ and a processor identifier $PID_i$;

computing a value $T_i$ by applying an advanced encryption standard (AES) algorithm to the shared secret $A_i$ and to a combination of a model description value $C_j$ of the portable electronic device i and the service-specific device identifier $ID_i$;

computing a shared key $SK_i$ by applying a second hash function to the value $T_i$; and providing the service-specific device identifier $ID_i$ and the shared key $SK_i$ to the service entity, wherein a trusted relationship is established between the service entity and the portable electronic device i using the service-specific device identifier $ID_i$ and the shared key $SK_i$.

28. The non-transitory computer readable medium as claimed in claim 27, wherein the instructions, when executed by the processor, further causes the processor to perform, for each portable electronic device i:

deriving at the manufacturing server a secondary private key $q_i$ from the shared secret $A_i$; and deriving at the manufacturing server a secondary public key $Q_i$ from the secondary private key $q_i$.

29. A non-transitory computer readable medium storing instructions which, when executed by a processor of a portable electronic device X, cause the processor to perform:
    receiving a broadcast message comprising a public key G of a service entity that provides a service Y;
    computing a shared secret $A_X$ as a function F of the public key G and of a private key $b_X$ of the portable electronic device X;
    computing a service-specific device identifier $ID_X$, associated with the service Y, of the portable electronic device X by applying a first hash function to a concatenation of a service description value $C_Y$ associated with the service Y and one or more identifiers of the portable electronic device X, wherein the identifiers comprise a device identifier $PIN_X$ and a processor identifier $PID_X$;
    computing a value $T_X$ by applying an advanced encryption standard (AES) algorithm to the shared secret $A_X$ and to a combination of a model description value $C_X$ of the portable electronic device X and the service-specific device identifier $ID_X$;
    computing a shared key $SK_X$ by applying a second hash function to the value $T_X$; and
    establishing a trusted relationship between the portable electronic device X and the service entity using the service-specific device identifier $ID_X$ and the shared key $SK_X$.

30. The non-transitory computer readable medium as claimed in claim 29, wherein the instructions, when executed by the processor, further causes the processor to perform:
    deriving a secondary private key $q_X$ from the shared secret $A_X$; and
    deriving a secondary public key $Q_X$ from the secondary private key $q_X$.

31. The non-transitory computer readable medium as claimed in claim 29, wherein the instructions, when executed by the processor, further causes the processor to perform:
    sending, to the service entity, a registration request comprising the service-specific device identifier $ID_X$.

32. A non-transitory computer readable medium storing instructions which, when executed by a processor of a service entity providing a service Y, cause the processor to perform:
    receiving, from a manufacturing server, public keys $\{B_i\}$ and corresponding service-specific device identifiers $\{ID_i\}$, associated with the service Y, for one or more portable electronic devices $\{i\}$, each service-specific device identifier $ID_i$ having been computed by applying a first hash function to a concatenation of a service description value $C_Y$ associated with the service Y and one or more identifiers of the portable electronic device i, wherein the identifiers comprise a device identifier $PIN_i$ and a processor identifier $PID_i$;
    receiving, from a particular portable electronic device X of the one or more portable electronic devices $\{i\}$, a registration request comprising a service-specific device identifier $ID_X$ of the particular portable electronic device X; and
    for each portable electronic device i:
        computing a shared secret $A_i$ as a function F of a private key g, of the service entity, and of the public key $B_i$ of the portable electronic device i;
        computing a value $T_i$ by applying an advanced encryption standard (AES) algorithm to the shared secret $A_i$ and to a combination of a model description value $C_j$ of the portable electronic device i and the service-specific device identifier $ID_i$; and
        computing a shared key $SK_i$ by applying a second hash function to the value $T_i$;
    and
        establishing a trusted relationship between the service entity and the particular portable electronic device X using a shared key $SK_X$ corresponding to the service-specific device identifier $ID_X$ of the particular portable electronic device X.

33. The non-transitory computer readable medium as claimed in claim 32, wherein the instructions, when executed by the processor, further causes the processor to perform, for each portable electronic device i:
    deriving a secondary private key $q_i$ from the shared secret $A_i$; and
    deriving a secondary public key $Q_i$ from the secondary private key $q_i$.

34. The non-transitory computer readable medium as claimed in claim 33, wherein the instructions, when executed by the processor, further causes the processor to perform, for each portable electronic device i:
    creating a certificate $CERT_i$ using the secondary public key $Q_i$ and the service-specific device identifier $ID_i$.

35. The non-transitory computer readable medium as claimed in claim 32, wherein the instructions, when executed by the processor, further causes the processor to perform:
    broadcasting a message to the one or more portable electronic devices $\{i\}$, the message including a public key G corresponding to the private key g of the service entity.

36. A non-transitory computer readable medium storing instructions which, when executed by a processor of a service entity providing a service Y, cause the processor to perform:
    receiving, from a manufacturing server, service-specific device identifiers $\{ID_i\}$, associated with the service Y, and corresponding shared keys $\{SK_i\}$ for one or more portable electronic devices $\{i\}$, each service-specific device identifier $ID_i$ having been computed by the manufacturing server by applying a first hash function to a concatenation of a service description value $C_Y$ associated with the service Y and one or more identifiers of the portable electronic device i, wherein the identifiers comprise a device identifier $PIN_i$ and a processor identifier $PID_i$, and each key $SK_i$ having been computed by the manufacturing server by:
        computing a shared secret $A_i$ as a function F of a private key g, of the service entity, and of a public key $B_i$ of the portable electronic device i;
        computing a value $T_i$ by applying an advanced encryption standard (AES) algorithm to the shared secret $A_i$ and to a combination of a model description value $C_j$ of the portable electronic device i and the service-specific device identifier $ID_i$; and
        computing the shared key $SK_i$ by applying a second hash function to the value $T_i$;
    receiving, from a particular portable electronic device X of the one or more portable electronic devices $\{i\}$, a registration request comprising a service-specific device identifier $ID_X$ of the particular portable electronic device X; and
    establishing a trusted relationship between the service entity and the particular portable electronic device X using a shared key $SK_X$ that corresponds to the service-specific device identifier $ID_X$ of the particular portable electronic device X.

37. The non-transitory computer readable medium as claimed in claim 36, wherein the instructions, when executed by the processor, further causes the processor to perform, for each portable electronic device i:
    deriving a secondary private key $q_i$ from the shared secret $A_i$; and deriving a secondary public key $Q_i$ from the secondary private key $q_i$.

38. The non-transitory computer readable medium as claimed in claim 37, wherein the instructions, when executed by the processor, further causes the processor to perform, for each portable electronic device i:

creating a certificate $CERT_i$ using the secondary public key $Q_i$ and the service-specific device identifier $ID_i$.

* * * * *